US012809524B2

(12) United States Patent
Ji et al.

(10) Patent No.: US 12,809,524 B2
(45) Date of Patent: Nov. 24, 2026

(54) MEMORY DEVICE AND OPERATING METHOD OF MEMORY DEVICE FOR DETERMINING A READ SCHEME BASED ON AN OPERATION TYPE

(71) Applicant: Samsung Electronics Co., Ltd., Suwon-si (KR)

(72) Inventors: Hyungtak Ji, Suwon-si (KR); Maksim Ostapenko, Suwon-si (KR); Youngsam Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/989,578

(22) Filed: Dec. 20, 2024

(65) Prior Publication Data

US 2025/0238141 A1 Jul. 24, 2025

(30) Foreign Application Priority Data

Jan. 18, 2024 (KR) ........................ 10-2024-0008273

(51) Int. Cl.
*G06F 3/06* (2006.01)

(52) U.S. Cl.
CPC .......... *G06F 3/0613* (2013.01); *G06F 3/0656* (2013.01); *G06F 3/0659* (2013.01); *G06F 3/0673* (2013.01)

(58) Field of Classification Search
CPC .... G06F 3/0613; G06F 3/0656; G06F 3/0659; G06F 3/0673
See application file for complete search history.

(56) References Cited

U.S. PATENT DOCUMENTS

| | | | | |
|---|---|---|---|---|
| 9,720,616 | B2 | 8/2017 | Yu et al. | |
| 11,314,446 | B2 | 4/2022 | Lam | |
| 2021/0286551 | A1 | 9/2021 | Dongaonkar et al. | |
| 2023/0073661 | A1 | 3/2023 | Mathaikutty et al. | |
| 2023/0289230 | A1 | 9/2023 | Xu et al. | |
| 2024/0070107 | A1* | 2/2024 | Yudanov | G06F 13/32 |
| 2024/0070801 | A1* | 2/2024 | Wu | G06V 10/82 |

(Continued)

FOREIGN PATENT DOCUMENTS

WO 2023046001 A1 3/2023

OTHER PUBLICATIONS

D. Lavenier, J.-F. Roy and D. Furodet, "DNA mapping using Processor-in-Memory architecture," 2016 IEEE International Conference on Bioinformatics and Biomedicine (BIBM), Shenzhen, China, 2016, pp. 1429-1435, doi: 10.1109/BIBM.2016.7822732. (Year: 2016).*

*Primary Examiner* — Edward J Dudek, Jr.
(74) *Attorney, Agent, or Firm* — F. CHAU & ASSOCIATES, LLC

(57) ABSTRACT

A memory device and an operating method of the memory device are disclosed. The memory device includes a memory processor including a plurality of processing units (PUs) and a processor controller configured to control the plurality of PUs and a memory controller configured to communicate with the processor controller and control first memory banks. The memory processor is configured to determine, based on a type of an operation performed by the memory processor, a read scheme by which the memory controller reads second data stored in second memory banks of a host device into the first memory banks as first data for the memory processor.

20 Claims, 18 Drawing Sheets

(56) References Cited

U.S. PATENT DOCUMENTS

| | | | | |
|---|---|---|---|---|
| 2024/0143497 | A1* | 5/2024 | Song | G11C 7/1006 |
| 2025/0110898 | A1* | 4/2025 | Aga | G06F 13/4234 |
| 2025/0118386 | A1* | 4/2025 | Kerstetter | G11C 7/1069 |
| 2025/0156309 | A1* | 5/2025 | Choi | G06F 12/0646 |
| 2025/0156356 | A1* | 5/2025 | Paul | G06F 3/0688 |
| 2025/0355561 | A1* | 11/2025 | Mai | G06F 3/0625 |

* cited by examiner

MEMORY DEVICE AND OPERATING METHOD OF MEMORY DEVICE FOR DETERMINING A READ SCHEME BASED ON AN OPERATION TYPE

CROSS-REFERENCE TO RELATED APPLICATION

This patent application claims priority under 35 USC § 119(a) to Korean Patent Application No. 10-2024-0008273, filed on Jan. 18, 2024, in the Korean Intellectual Property Office, the entire disclosure of which is incorporated by reference in its entirety herein.

TECHNICAL FIELD

One or more embodiments are directed to a memory device and an operating method of the memory device.

DISCUSSION OF RELATED ART

An artificial neural network (ANN) is a computational model inspired by the structure of the brain. The ANN includes layers of interconnected nodes (or neurons), which process information by responding to input data. An internal node of the ANN may receive input from multiple nodes, applies a mathematical operation to these inputs, and then passes its output to one or more subsequent nodes.

Efficient and high-performance processing of an ANN is important for electronic devices such as computers, smartphones, tablets, and wearable devices. However, a large amount of power may be consumed when the processing performance of the electronic device processing the ANN increases. A hardware accelerator for performing tasks related to the ANN may be used to increase the processing performance of the electronic device. A hardware accelerator disposed within or close to a memory may be referred to as a near-memory accelerator.

SUMMARY

According to an embodiment, there is provided a memory device including a memory processor including a plurality of processing units (PUs) and a processor controller configured to control the plurality of PUs and a memory controller configured to communicate with the processor controller and control first memory banks. The memory processor is configured to determine, based on a type of an operation performed by the memory processor, a read scheme by which the memory controller reads second data stored in second memory banks of a host device into the first memory banks as first data for the memory processor.

The read scheme may be one of a first scheme of reading the second data stored in the second memory banks column-wise, a second scheme of reading the second data stored in the second memory banks row-wise, or a third scheme of accessing and reading the second data stored in the second memory banks with different addresses simultaneously through interleaving.

The memory processor may be configured to relocate the first data in the first memory banks to match the read scheme.

The memory processor may be configured to receive information for the operation from the host device and store the information for the operation in a register of the processor controller.

The information for the operation includes a dynamic random-access memory (DRAM) map including at least one of a number of rows of the second memory banks, a number of columns of the second memory banks, a number of the second memory banks, sizes of the second memory banks, and an offset and processor register set information including at least one of information related to sizes of the first memory banks, a number of rows of the first memory banks, a number of columns of the first memory banks, a number of first memory banks, information indicating whether to relocate the first data, a direction in which the first data is stored in the first memory banks, and an operation type for the first data.

The memory processor may be configured to determine, based on at least one of the type of the operation and throughputs of the plurality of PUs, whether to relocate the first data to the first memory banks and whether to reuse the second data read from the second memory banks.

The memory processor may be configured to relocate the first data in the first memory banks or divide the first data according to throughputs of the plurality of PUs.

The memory processor may be configured to determine an address area for reading the second data in the second memory banks by considering the read scheme.

The memory processor may be configured to store, in the first memory banks, second data read from the second memory banks of the host device and enable the plurality of PUs to perform an operation corresponding to the type of the operation by allocating the second data stored in the first memory banks to the plurality of PUs by the processor controller.

The memory processor may further include a static random-access memory (SRAM) buffer, may be configured to store, in the SRAM buffer, an operation result obtained when the plurality of PUs performs the operation corresponding to the type of the operation, and may be configured to write the operation result stored in the SRAM buffer to the second memory banks.

The processor controller may include an instruction fetcher configured to fetch, from the host device, an instruction including information for an operation performed by the memory processor and a data reformatter configured to relocate the first data to the first memory banks to match the read scheme corresponding to the type of the operation included in the instruction.

The first memory banks may further include row buffers respectively corresponding to the first memory banks, wherein the data reformatter may be configured to copy the first data stored in a first area of the first memory banks to the row buffers and move the first data copied to the row buffers to a second area corresponding to a column or a row of another bank of the first memory banks to match the read scheme.

The first memory banks may further include a shared buffer shared among the first memory banks, wherein the data reformatter may be configured to copy the first data stored in a first area of the first memory banks to the shared buffer and move the first data copied to the shared buffer to a second area corresponding to a column or a row of another bank of the first memory banks to match the read scheme.

The memory processor may be configured to receive a request for access to the first memory banks from the host device through an interface based on a compute express link (CXL) protocol or a peripheral component interconnect express (PCI-e) protocol.

The memory processor may be connected to the first memory banks through a device bus, and the memory controller may be connected to the host device through a PCI-e interface.

The memory device may be integrated into a mobile device, a mobile computing device, a mobile phone, a smartphone, a personal digital assistant (PDA), a fixed location terminal, a tablet computer, a computer, a wearable device, a laptop computer, a server, an entertainment unit, a navigation device, a communication device, a global positioning system (GPS) device, a television, a tuner, a satellite radio, a music player, a digital video player, a digital video disk (DVD) player, a vehicle, a component of the vehicle, an avionics system, a drone, a multicopter, or a medical device.

According to an embodiment, there is provided an operating method of a memory device, the operating method including: receiving, from a host device, information for an operation performed by a memory processor of the memory device; determining, based on a type of the operation included in the information for the operation, a read scheme by which a memory controller reads second data stored in second memory banks of the host device; reading the second data into first memory banks as first data to match the read scheme; performing an operation corresponding to the type of the operation by allocating the first data stored in the first memory banks to a plurality of PUs by a processor controller; and writing an operation result obtained by performing the operation to the second memory banks.

The determining of the read scheme may include determining an address area for reading the second data from the second memory banks by considering the read scheme.

The reading of the second data in the memory banks may include relocating the first data for the memory processor to the first memory banks for the memory processor to match the read scheme.

BRIEF DESCRIPTION OF THE DRAWINGS

These and/or other aspects of the inventive concept will become apparent from the following description of embodiments, taken in conjunction with the accompanying drawings of which.

DETAILED DESCRIPTION

Figure 1:
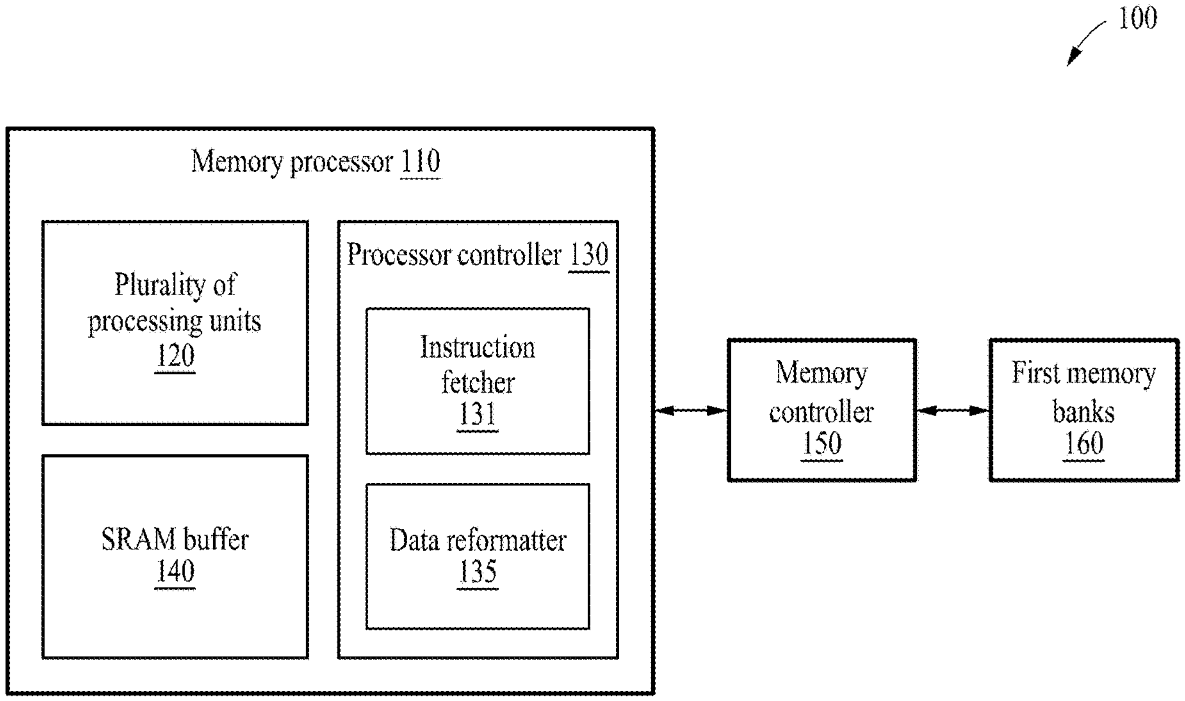
FIG. 1 is a schematic block diagram illustrating a memory device according to an embodiment.

The following detailed description is provided as an example, but various alterations and modifications may be made to the embodiments. Accordingly, the embodiments are not construed as limited to the disclosure and should be understood to include all changes, equivalents, and replacements within the idea and the technical scope of the disclosure.

It should be noted that if one component is described as being "connected", "coupled", or "joined" to another component, another component may be "connected", "coupled", and "joined" between the first and second components, although the first component may be directly connected, coupled, or joined to the second component. The singular forms "a", "an", and "the" are intended to include the plural forms as well, unless the context clearly indicates otherwise.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 is a schematic block diagram illustrating a memory device according to an embodiment. Referring to FIG. 1, a memory device 100 includes a memory processor 110, a memory controller 150, and first memory banks 160.

The memory processor 110 may include a plurality of processing units (PUs) 120 and a processor controller 130.

The memory processor 110 may be, for example, a near-memory processor (NMP) that performs an operation near a memory. However, embodiments are not limited thereto. The memory processor 110 may be referred to as a "near-memory accelerator" because the memory processor 110 may accelerate an operation near a memory. The memory processor 110 may further include a static random-access memory (SRAM) buffer 140. The SRAM buffer 140 may be used as, for example, a buffer for the memory processor 110.

The plurality of PUs 120 may be, for example, connected to the first memory banks 160 through a device bus. The plurality of PUs 120 may be referred to as "near-memory PUs" because the plurality of PUs 120 is PUs for the memory processor 110. The memory device 100 may execute acceleration logic and process an operation through the plurality of PUs 120 located in a memory or a near memory other than a host device (e.g., a host device 201 of FIG. 2), thereby improving the overall application processing speed.

The plurality of PUs 120 may be implemented at a location where the plurality of PUs 120 may access first data stored in memory areas of the first memory banks 160 without passing data through the main data bus between a processor ("host processor") of the host device and a memory. By being implemented near physical memory areas (e.g., the memory areas of the first memory banks 160), the plurality of PUs 120 do not pass through but bypass the main data bus between the processor of the host device and the memory areas to process the first data, thereby increasing processing speed. For example, a bus or signal line separate from the main data bus may be present between the PUs 120 and the first memory banks 160 to enable the PUs 120 to access the first data without needing to use the main data bus.

The plurality of PUs 120 may execute the acceleration logic by cooperating with the SRAM buffer 140 and the processor controller 130. The processor controller 130 may receive an instruction from the host processor.

The plurality of PUs 120 may include a hardware component (e.g., an analog and/or digital circuit) for executing the acceleration logic. The acceleration logic may include an operation for hardware acceleration, for example, a neural network operation. The plurality of PUs 120, for example, may be independently implemented per rank in a memory buffer. For example, each of the PUs 120 may be configured to operate on corresponding memory banks of the first memory banks 160. The plurality of PUs 120 may accelerate parallel execution by being independently implemented by rank and processing the acceleration logic. The plurality of PUs 120 may be implemented as hardware and include, for example, at least one of a microprocessor, a central processing unit (CPU), a processor core, a multi-core processor, a multiprocessor, an application-specific integrated circuit (ASIC), a field-programmable gate array (FPGA), a tensor processing unit (TPU), a digital signal processor (DSP), a network processor and a graphics processing unit (GPU).

The SRAM buffer 140 may store data. The SRAM buffer 140 may include, for example, an input buffer and an output buffer. The SRAM buffer 140 may operate as the input buffer or the output buffer.

The processor controller 130 may control the plurality of PUs 120. The processor controller 130 may include, for example, an instruction fetcher 131 and a data reformatter 135. The instruction fetcher 131 may fetch, from the host device, an instruction including information for an operation performed by the memory processor 110. The data reformatter 135 may relocate the first data in the first memory banks 160 to match a read scheme corresponding to an operation type included in the instruction fetched by the instruction fetcher 131. For example, the first data may correspond to a weight for a multiply-accumulate (MAC) operation. However, embodiments are not limited thereto. The instruction fetcher 131 and the data reformatter 135 may be implemented by one or more logic circuits.

The memory processor 110 may determine, based on the type of the operation performed by the memory processor 110, a read scheme of the memory controller 150 for second memory banks of the host device. The read scheme may include, for example, a first scheme of reading second data stored in the second memory banks row-wise, a second scheme of reading the second data stored in the second memory banks column-wise, and a third scheme of reading the second data divided through interleaving.

Figure 10:
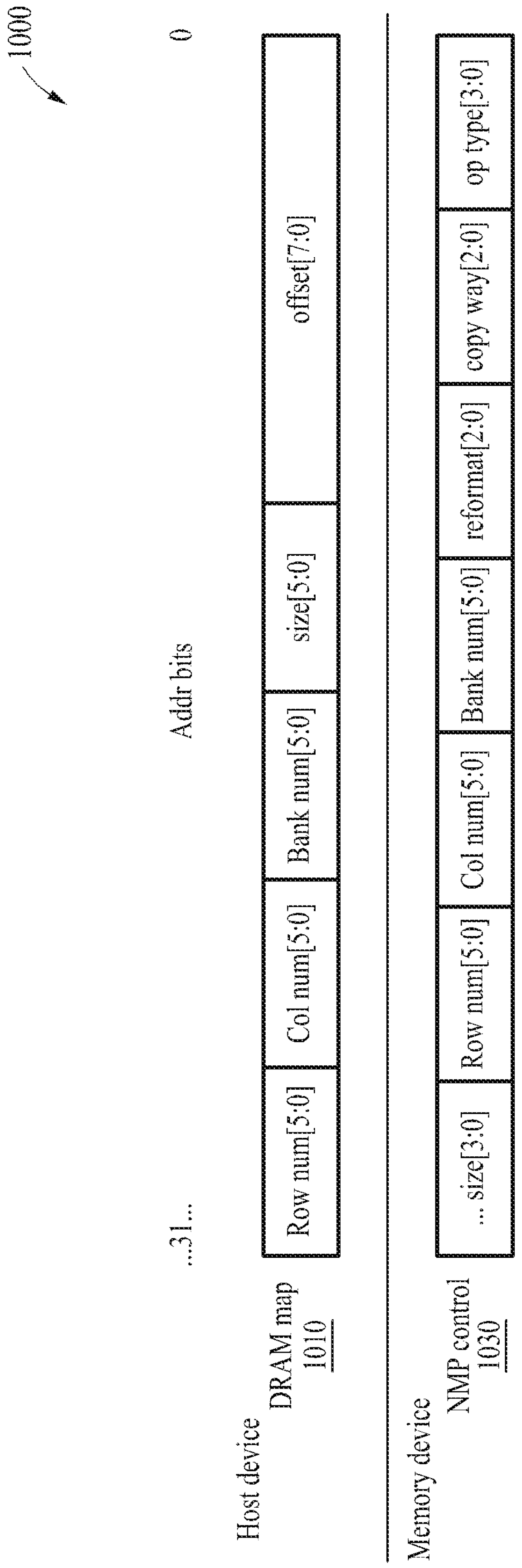
FIG. 10 is a diagram illustrating a register set of a processor controller, according to an embodiment.

The memory processor 110 may relocate the first data in the first memory banks to match the read scheme. The memory processor 110 may receive information for an operation from the host device. The memory processor 110 may store the information for an operation in a register of the processor controller 130. The information for an operation may include a dynamic RAM (DRAM) map corresponding to host information and processor register set information, as illustrated in FIG. 10.

The DRAM map may include, for example, information indicating at least one of the number of rows of the second memory banks, the number of columns of the second memory banks, the number of second memory banks, the sizes of the second memory banks, and an offset. The processor register set information may include, for example, at least one of information related to the sizes of the first memory banks, the number of rows of the first memory banks, the number of columns of the first memory banks, the number of first memory banks, whether to relocate the first data, the direction in which the first data is stored in the first memory banks, and an operation type for the first data. For example, the direction may indicate a direction the first data is to be moved.

The information related to the operation type for the first data may include, for example, information related to the direction in which an instruction (e.g., memcpy) for moving and/or copying data for an operation is executed, types of operations performed by the plurality of PUs 120, and/or relocation for the first memory banks of the memory device. The direction in which an instruction for moving and/or copying data for an operation is executed may include, for example, a first direction from the second memory banks of the host device to the first memory banks 160 of the memory device 110 or a second direction from the SRAM buffer 140 of the memory processor 110 to the second memory banks of the host device. However, embodiments are not limited thereto. The direction may indicate the source and destination for data to be moved.

The types of the operations performed by the plurality of PUs 120 may include artificial intelligence (AI) operations, such as a general matrix vector multiplication (GEMV) operation, a MAC operation, and an Eltwise layer operation. However, embodiments are not limited thereto.

The relocation-related information may include the setting of a reformat bit indicating whether relocation is performed and/or information about whether to perform relocation using a relocation scheme (e.g., a row buffer) or a shared buffer.

The memory processor 110 may determine, based on at least one of an operation type and the throughputs of the plurality of PUs 120, whether to relocate the first data to the first memory banks 160 and whether to reuse the second data read from the second memory banks of the host device. For example, the throughputs may refer to the amounts of data each of the PUs 120 can process over a given period of time. The second memory banks may correspond to DRAM memory banks of the host device. The second data may be, for example, input data. However, embodiments are not limited thereto.

The memory processor 110 may relocate the first data to the first memory banks 160 according to the throughputs of the plurality of PUs 120 or divide the first data according to the throughputs of the plurality of PUs 120.

The memory processor 110 may determine an address area for reading the second data from the second memory banks of the host device by considering the read scheme.

The memory processor 110 may store the second data read from the second memory banks of the host device in the first memory banks 160. The memory processor 110 may enable the plurality of PUs 120 to perform an operation corresponding to the operation type by allocating the second data stored in the first memory banks 160 to the plurality of PUs 120 by the processor controller 130.

The memory processor 110 may store, in the SRAM buffer 140, an operation result obtained when the plurality of PUs 120 perform an operation corresponding to the operation type. The memory processor 110 may write the operation result stored in the SRAM buffer 140 to the second memory banks.

The memory processor 110 may receive a request for access to the first memory banks 160 from the host device through an interface or an external bus based on at least one of a compute express link (CXL) protocol and a peripheral component interconnect express (PCI-e) protocol.

The memory controller 150 may communicate with the processor controller 130 and control the first memory banks 160 including the first data for the memory processor 110.

The first memory banks 160 may correspond to a memory (e.g., DRAM) for the memory processor 110. Here, "memory bank(s)" may be blocks of memories in a same area when the area of a memory is divided into a plurality of blocks. The memory bank may have multiple pairs of identical addresses representing memory areas. For example, when 64-bit input/output occurs, the memory bank may correspond to a logical bundle of one or more memories within a channel. A channel is a bundle that shares a single data path. The memory bank may need to be used in multiple pairs or sets.

The first memory banks 160 may further include row buffers respectively corresponding to the first memory banks 160. The data reformatter 135 may copy the first data stored in a first area of the first memory banks 160 to the row buffers and move the first data copied to the row buffers to a second area corresponding to a column or a row of another bank of the first memory banks 160 to match the read scheme. For example, the first data may be copied to the row if the read scheme is row-wise but copied to the column if the read scheme is column-wise.

The first memory banks 160 may further include a shared buffer shared among the first memory banks 160. The data reformatter 135 may copy the first data stored in the first area of the first memory banks 160 to the shared buffer and move the first data copied to the shared buffer to the second area corresponding to a column or a row of another bank of the first memory banks 160 to match the read scheme.

The memory processor 110 may be connected to the first memory banks 160 through the device bus. In addition, the memory controller 150 may be connected to the host device through a PCI-e interface.

The memory device 100 may be integrated into various devices such as a mobile device, a mobile computing device, a mobile phone, a smartphone, a personal digital assistant (PDA), a fixed location terminal, a tablet computer, a computer, a wearable device, a laptop computer, a server, an entertainment unit, a navigation device, a communication device, a global positioning system (GPS) device, a television, a tuner, a satellite radio, a music player, a digital video player, a digital video disk (DVD) player, a vehicle, a component of the vehicle, an avionics system, a drone, a multicopter, and a medical device.

To perform an inference operation in artificial intelligence (AI) in a hardware accelerator, data may need to be stored exactly in a memory area (e.g., DRAM) according to a corresponding operation order. In this case, the data may need to be stored based on a data layout according to direct memory access (DMA) or the read policy of DRAM. However, according to an embodiment, there is no need to preconfigure the layout of data required for an operation. Instead, the memory processor 110 may convert data to match an operator being executed in real time or efficiently perform an operation by reading a desired portion of data. In addition, according to an embodiment, when the memory controller 150 manages and/or converts a memory area (e.g., memory banks) and reads data stored in the memory area according to the type of an operation performed by the memory processor 110 and/or the type of an operator, the data may be relocated in the memory banks in a manner advantageous to the operation speed of the memory processor 110 before being read. Accordingly, the operation speed may increase and the memory area may be efficiently managed.

FIGS. 2A to 2E are diagrams illustrating various connection structures between a memory device and a host device, according to embodiments.

Figure 2A:
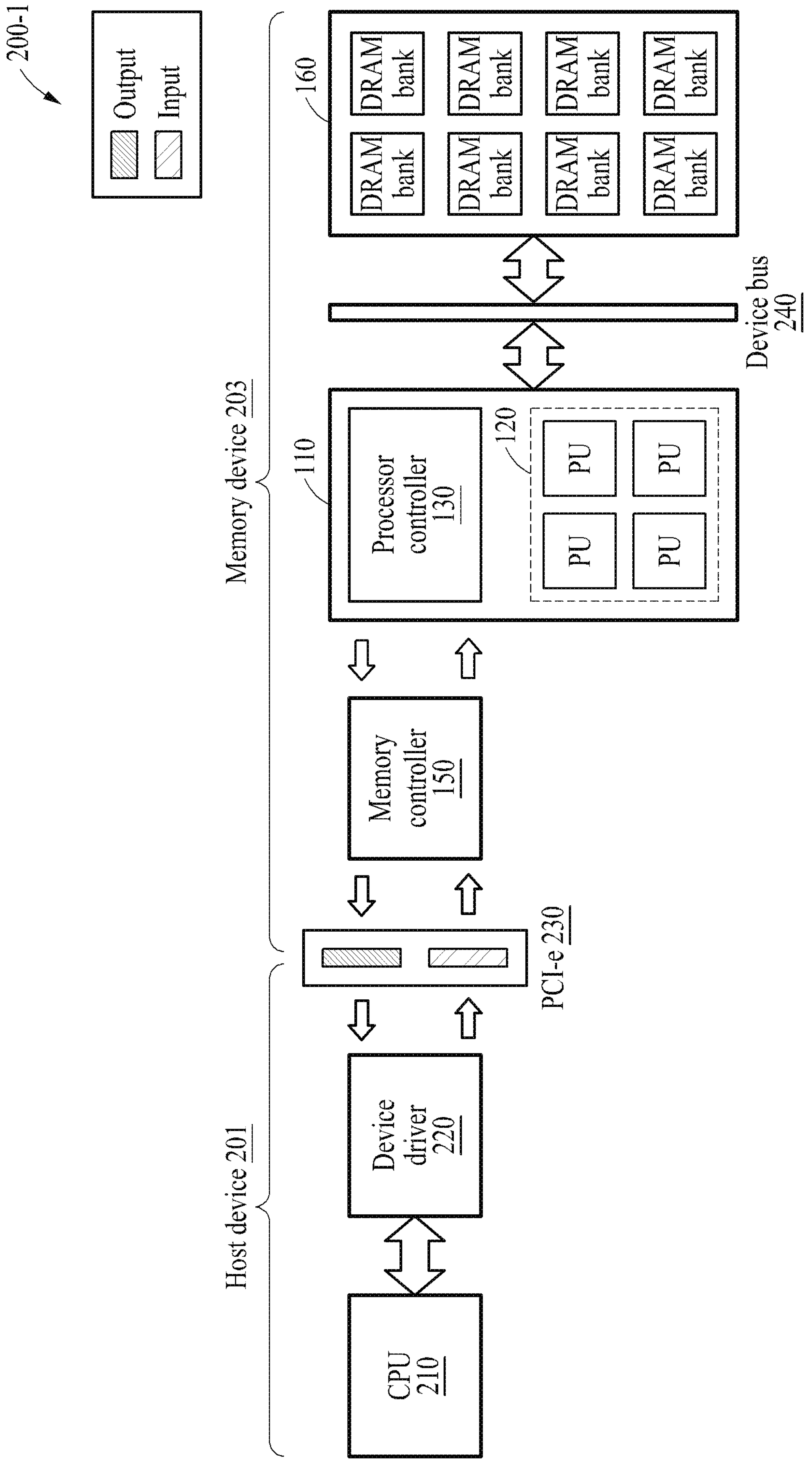
FIGS. 2A to 2E are diagrams illustrating various connection structures between a memory device and a host device, according to embodiments.

FIG. 2A illustrates a diagram 200-1 showing a connection state between the host device 201 and a memory device 203.

When an instruction is transmitted from the host device 201 to the memory device 203, the processor controller 130 of the memory device 203 may redistribute or divide data according to the throughputs of the PUs 120 such that an operation is efficiently performed by the PUs 120. The memory processor 110 is mainly used for inference of AI applications (e.g., Deeprecsys, a large language model (LLM), and a neural network (NN)) and may help an operation of an AI model by distributing and/or accelerating an operation of the host device 201.

The memory device 203 may also be used for driving an algorithm involving storage and multiplication operations of a memory in addition to, for example, a MAC operation and/or a vector-matrix multiplication (VMM) operation. The memory device 203 may directly perform an operation in a memory without moving data, thereby reducing data movement and increasing area efficiency.

The host device 201 may include a processor (e.g., a CPU 210) and may be connected to the memory device 203 through a device driver 220. The host device 201 may move or copy second data stored in second memory banks of the host device 201 to first memory banks of the memory device 203 through PCI-e 230.

According to a memory access instruction transmitted by the host device 201, the plurality of PUs 120 of the memory device 203 may simultaneously and in parallel process the data stored in the first memory banks. For example, each of the PUs 120 may perform a calculation on a respective part of the data to generate a plurality of results that can be used to generate the inference.

The memory processor 110 may be connected to the first memory banks 160 through the device bus 240. In addition, the memory controller 150 may be connected to the host device 201 through a PCI-e interface.

Figure 2B:
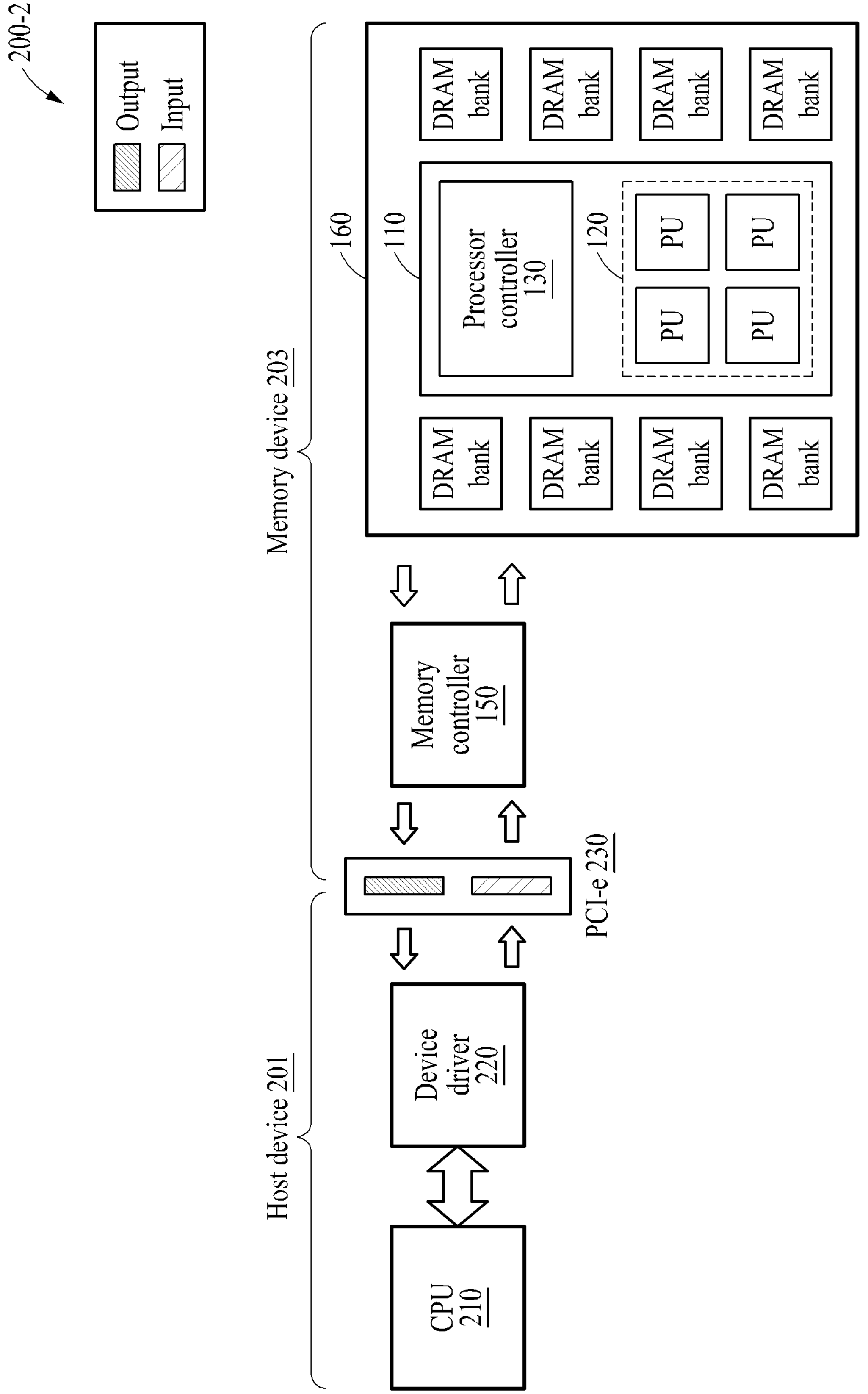

FIG. 2B illustrates a diagram 200-2 showing a connection state between the host device 201 and the memory device 203.

The memory processor 110 may be located in the first memory banks 160. For example, the memory processor 110 may be located in a memory that includes the memory banks 160. In this case, the memory processor 110 may be directly connected to the first memory banks 160 without passing data through the device bus 240 illustrated in FIG. 2A.

Figure 2C:
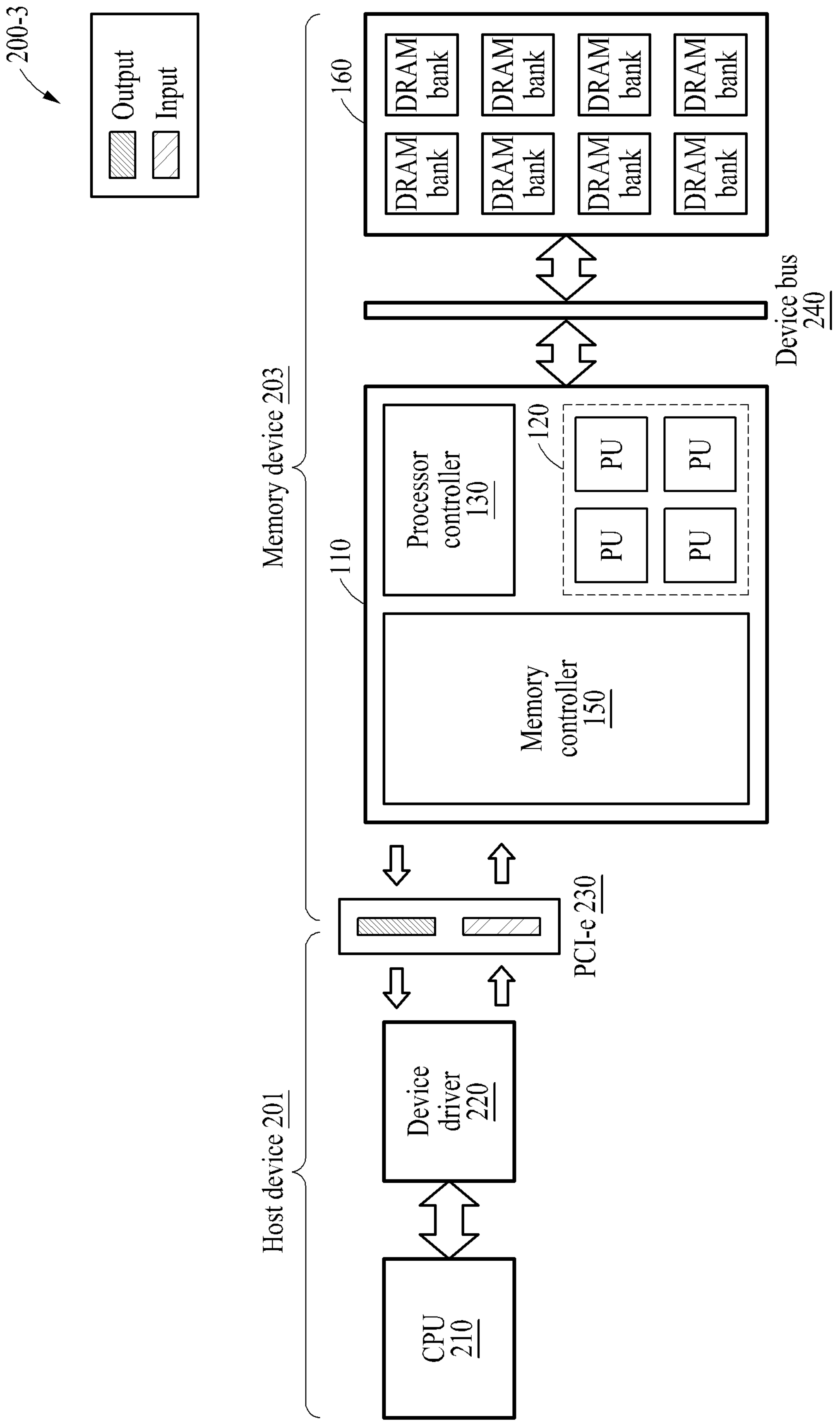

FIG. 2C illustrates a diagram 200-3 showing the connection state between the host device 201 and the memory device 203.

Depending on embodiments, the NMP controller 130 and the memory controller 150 may be integrated into a single controller, or the NMP controller 130 and the memory controller 150 may be included together in the memory processor 110 as illustrated in FIG. 2C.

When the NMP controller 130 and the memory controller 150 are integrated into a single controller, the single controller may be located outside the first memory banks 160 and may be connected to the first memory banks 160 through the device bus 240. For example, the single controller may be located outside a memory that includes the first memory banks 160.

Likewise, when the NMP controller 130 and the memory controller 150 are included together in the memory processor 110, the NMP controller 130 and the memory controller 150 may be connected to the first memory banks 160 through the device bus 240.

Figure 2D:
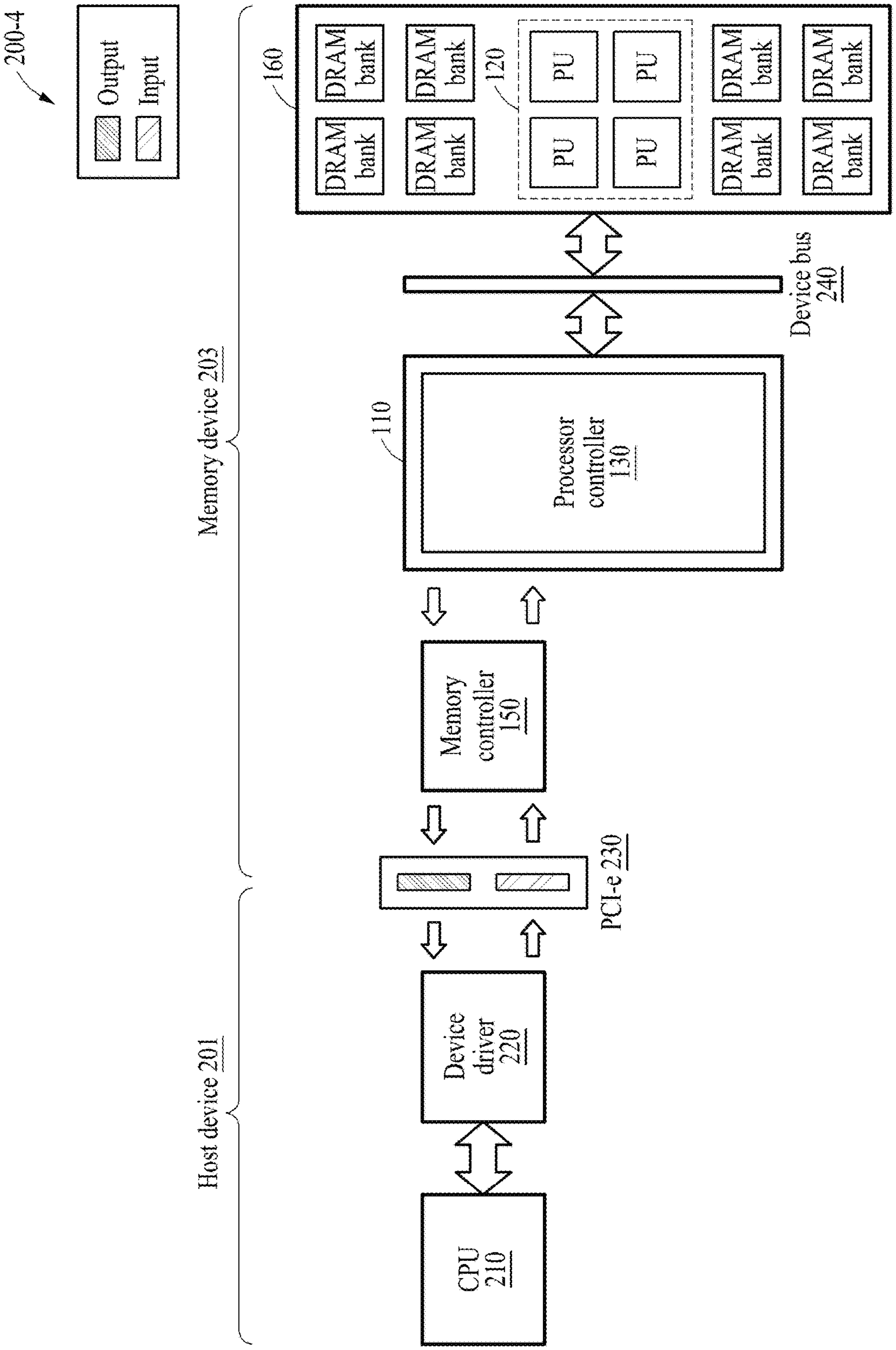

FIG. 2D illustrates a diagram 200-4 showing the connection state between the host device 201 and the memory device 203.

Depending on embodiments, the plurality of PUs 120, which is illustrated in the memory processor 110 in FIGS. 2A and 2C, may be in (e.g., in the middle of) the first memory banks 160. For example, the plurality of PUs 120 may be located in a memory having several memory banks. FIG. 2D illustrates the plurality of PUs 120 being located between a group of the memory banks and the remaining memory banks. The memory controller 150 may be included in the memory processor 110 together with the NMP controller 130 as illustrated in FIG. 2C or may be located separately as illustrated in FIG. 2D. When the plurality of PUs 120 is located in the first memory banks 160, the plurality of PUs 120 may be connected to the NMP controller 130 through the device bus 240.

Figure 2E:
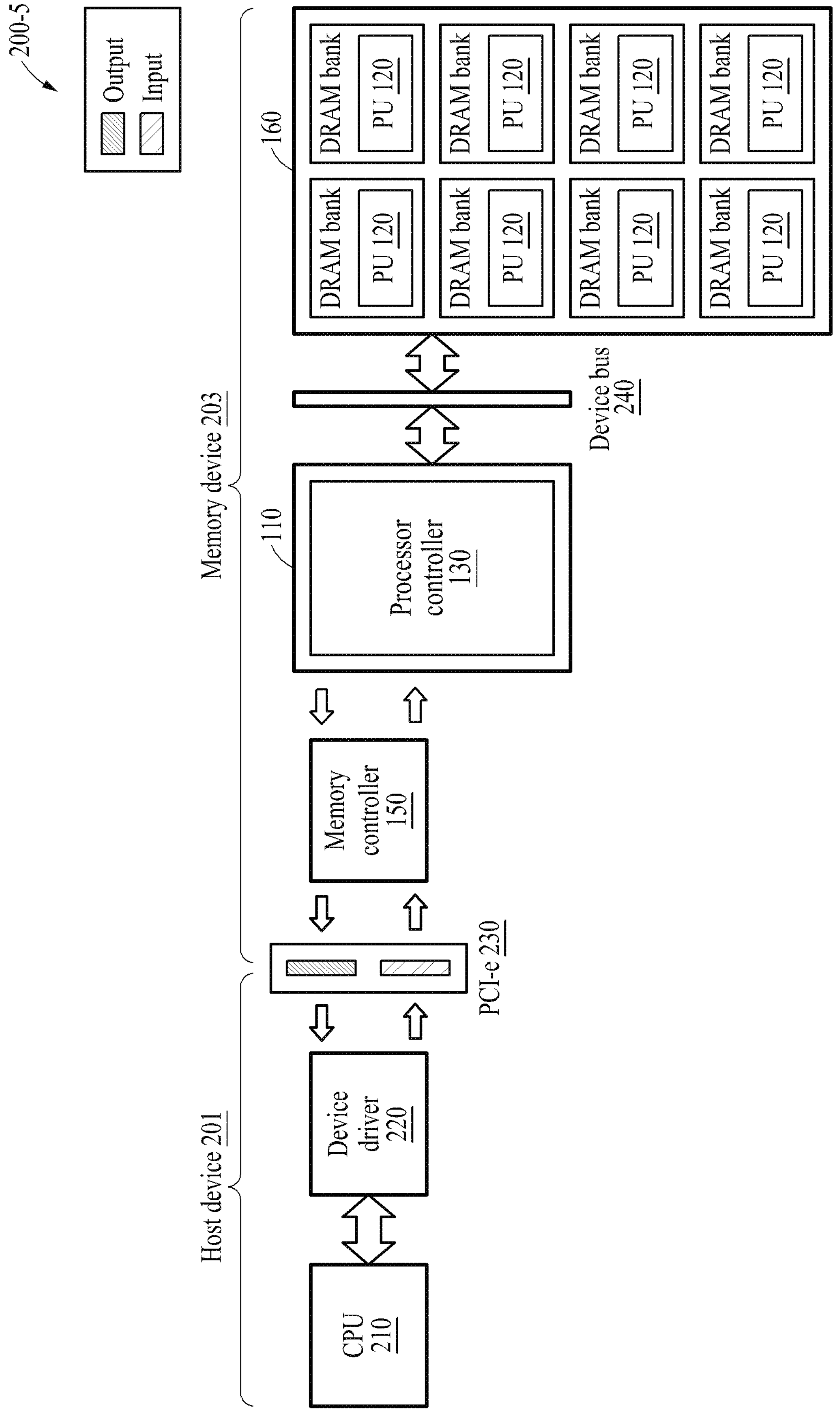

FIG. 2E illustrates a diagram 200-5 showing the connection state between the host device 201 and the memory device 203.

Depending on embodiments, each of the plurality of PUs 120 may be included in each of the first memory banks 160. For example, each one of the PUs 120 may be located in a corresponding memory bank among a plurality of memory banks located within a memory. When each of the plurality of PUs 120 is included in each of the first memory banks 160, each of the PUs 120 may perform an individual operation on a first memory bank to which each of the PUs 120 belongs according to the control signal of the NMP controller 130. In this case, each of the first memory banks 160 may perform different operations. For example, a first one of the PUs 120 could perform a first operation on data stored in a first bank among the first memory banks 160, a second one of the PUs 120 could perform a second operation on data stored in a second bank among the second memory banks 160, etc.

Figure 3:
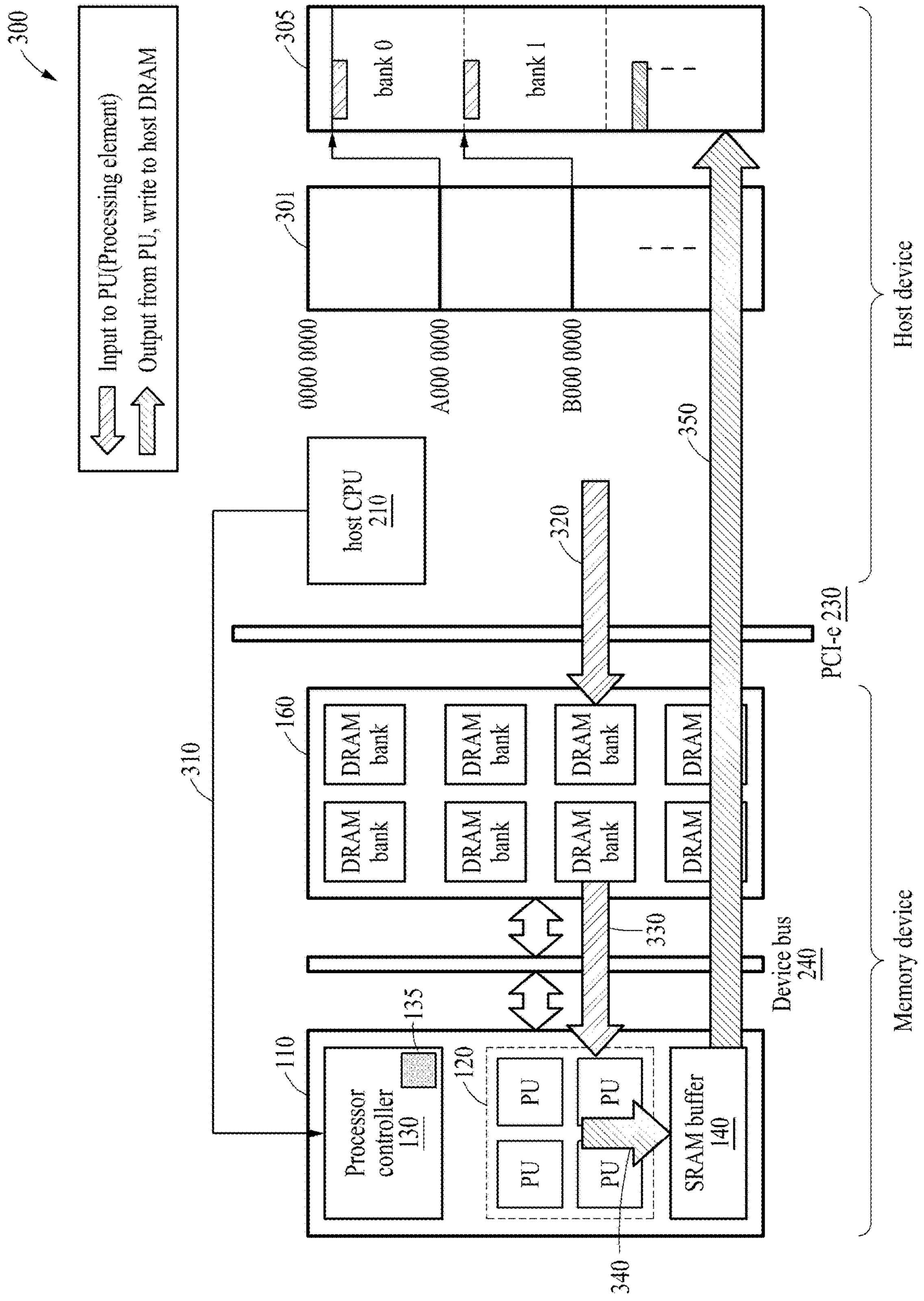
FIG. 3 is a diagram illustrating an operation process of a memory device, according to an embodiment.

FIG. 3 is a diagram illustrating an operation process of a memory device, according to an embodiment. Referring to FIG. 3, when a host device transmits an instruction to a memory device, the memory device may perform an operation through operations 310 to 350 illustrated in FIG. 3.

In operation 310, the memory device receives information for an operation from the CPU 210 of the host device and store the information in an instruction register 135 of the processor controller 130.

In operation 320, the CPU 210 of the host device moves or copies pieces of data, which are stored in second memory banks 305 (e.g., DRAM) of the host device and loaded for inference, to the first memory banks 160 (e.g., DRAM) of the memory device through the PCI-e interface 230. The memory device determines or selects, based on an operation type identified by the information stored in the processor controller 130, a read scheme that is used for operation execution from among a first scheme of performing row-wise reading and a second scheme of performing column-wise reading. For example, the memory device determines the first scheme when the operation type has a first value associated with row-wise reading and determines the second scheme when the operation type has a second value different from the first value that is associated with column-wise reading. When reading second data stored in the second memory banks 305 of the host device, the memory device may determine a reading address area by considering interleaving. For example, when there is a change in a data read scheme or the layout of stored data, the memory device may fetch and relocate the data using a data reformatter based on the read scheme.

The memory device may fetch pieces of data stored in the second memory banks 305 of the host device to the first memory banks 160 of the memory device. In this case, an address corresponding to the second data stored in the second memory banks 305 of the host device row-wise may be determined by an address and/or an offset stored in a DRAM map 301 for the host device.

In operation 330, the memory device may perform an operation by allocating, to the PUs 120, the data moved or copied to the first memory banks 160 through the processor controller 130. The processor controller 130 may relocate the data based on an operation type according to the throughputs of the PUs 120 or distribute the throughputs to efficiently perform an operation. For example, the PUs 120 may operate on the moved/copied data or the relocated data to generate results.

In operation 340, the memory device may temporarily store the data in a buffer (e.g., the SRAM buffer 140) each time an operation of the PUs 120 is terminated. For example, the PUs may store the results in the buffer.

In operation 350, the memory device moves or copies the data temporarily stored in the SRAM buffer 140 to the second memory banks 305 of the host device through the processor controller 130 and the CPU 210 of the host device. For example, the memory device may move or copy the data temporarily stored in the SRAM buffer 140 to the second memory banks 305 of the host device using a memcpy instruction.

Figure 4A:
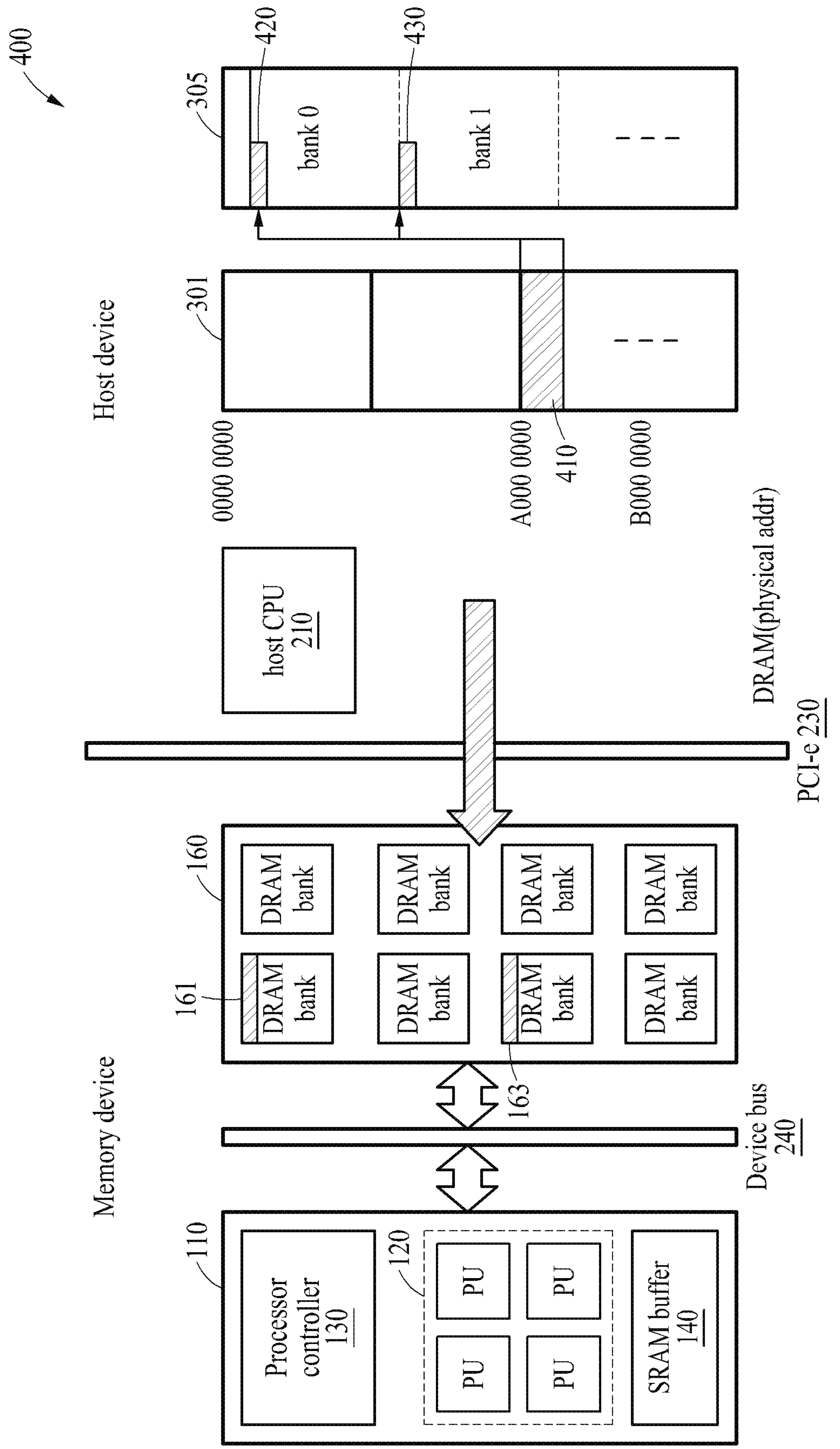
FIG. 4A is a diagram illustrating a first scheme of reading second data stored in second memory banks row-wise among read schemes of a memory device, according to an embodiment.

FIG. 4A is a diagram illustrating a first scheme of reading second data stored in second memory banks row-wise among read schemes of a memory device, according to an embodiment. FIG. 4A illustrates a diagram 400 showing the process of storing second data in the first memory banks 160 according to the first scheme, wherein the second data is read from bank 0 420 and bank 1 430 of the second memory banks 305.

The memory device determines a read scheme such that the second data, which is stored in the bank 0 420 and the bank 1 430 of the second memory banks 305 of a host device, may be read in a desired manner. The memory device may determine a useful read scheme according to an operation type. The read scheme may be a scheme of reading the second data stored in the bank 0 420 and the bank 1 430 row-wise according to the bank level. The memory device may relocate or reformat the data stored in the bank 0 420 and the bank 1 430 according to the read scheme.

For example, when the second data is stored row by row in each of the bank 0 420 and the bank 1 430 of the host device for a GEMV operation, the memory device may move or copy the second data stored row-by-row in each of the bank 0 420 and the bank 1 430 of the host device to each of the first memory banks 160 of the memory device row-wise. In this case, an address corresponding to the second data stored row-by-row in each of the bank 0 420 and the bank 1 430 of the host device may be determined by an address and/or an offset 410 stored in the DRAM map 301 for the host device.

The memory device may store the second data stored row-by-row in each of the bank 0 420 and the bank 1 430 of the second memory banks 305 in a first area 161 and a second area 163 of the first memory banks 160 row-wise. For example, when the data is stored in a row of bank 0 420 and a row of bank 1 430, it can then be moved so it is similarly stored in a row of one bank of the banks 160 and a row of another bank of the banks 160.

Figure 4B:
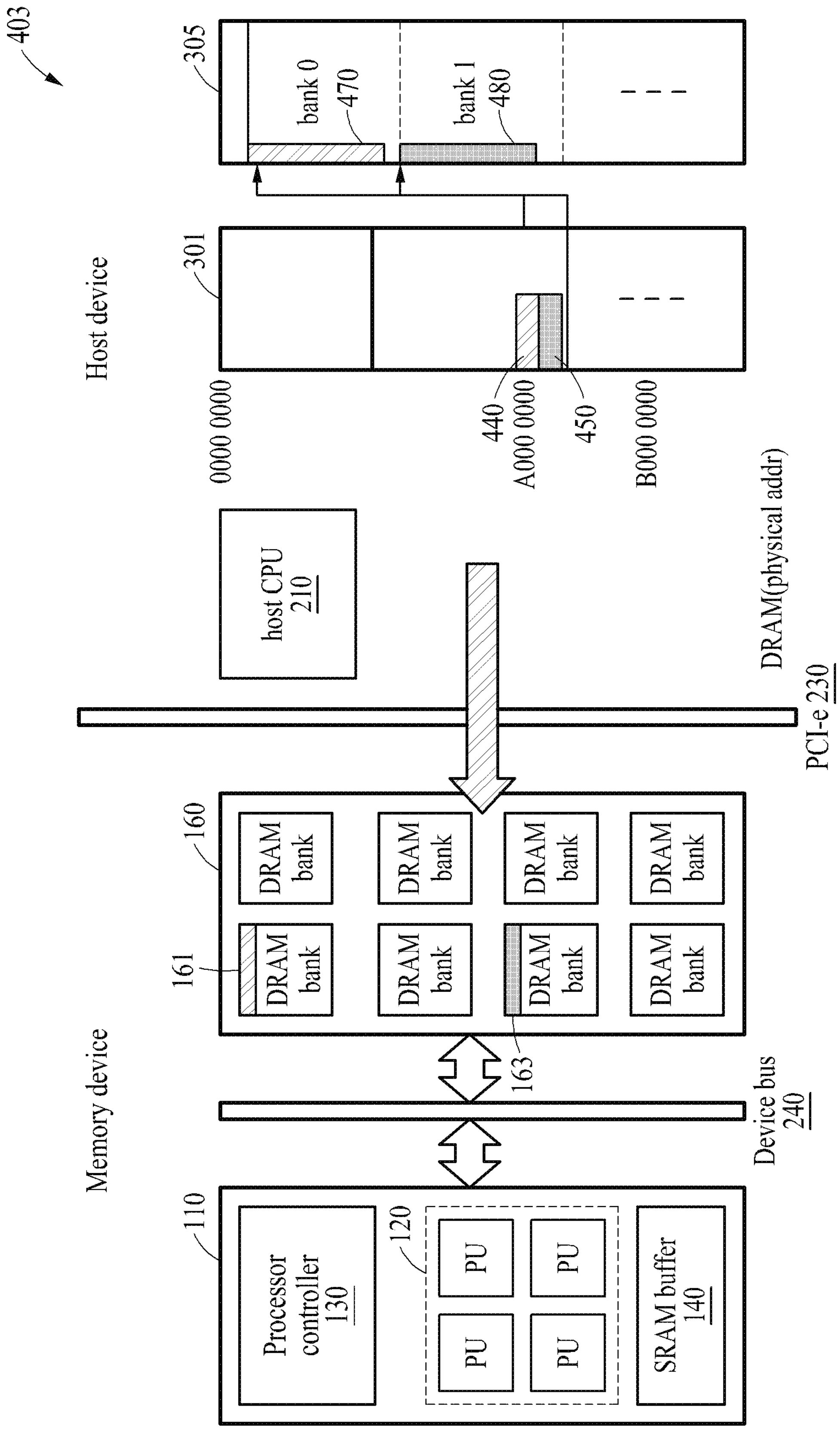
FIG. 4B is a diagram illustrating a second scheme of reading the second data stored in the second memory banks column-wise among the read schemes of the memory device, according to an embodiment.

FIG. 4B is a diagram illustrating a second scheme of reading the second data stored in the second memory banks column-wise among the read schemes of the memory device, according to an embodiment. FIG. 4B illustrates a diagram 403 showing the process of storing second data in the first memory banks 160 according to the second scheme, wherein the second data is read column-by-column from bank 0 470 and bank 1 480 of the second memory banks 305.

When reading the second data column-wise is useful in performing an operation on the second data, wherein the second data is stored in each of the bank 0 470 and the bank 1 480, the memory device may perform the operation by reading the second data column-wise.

The memory device may read the second data column-by-column (e.g., column-wise), wherein the second data is stored in each of the bank 0 470 and the bank 1 480 of the host device and then move or copy the second data to each of the first memory banks 160 of the memory device row-wise. In this case, an address corresponding to the second data stored column-by-column in the bank 0 470 and the bank 1 480 may be determined by an address and/or offsets 440 and 450 stored in the DRAM map 301 for the host device. For example, when a first part of the data is stored at address or offset 440 in a column of bank 0 470 and a second part of the data is stored at address or address 450 in a column of bank 1 480, it can then be copied so the first part is stored in a row of one bank of the banks 160 and the second part is stored in a row of another bank of the banks 160.

For example, when it is necessary to read the second data stored in the second memory banks 305 in a non-sequential manner, such as zero-skipping, the memory device may read the second data row-wise or column-wise using the read scheme described above.

Figure 5A:
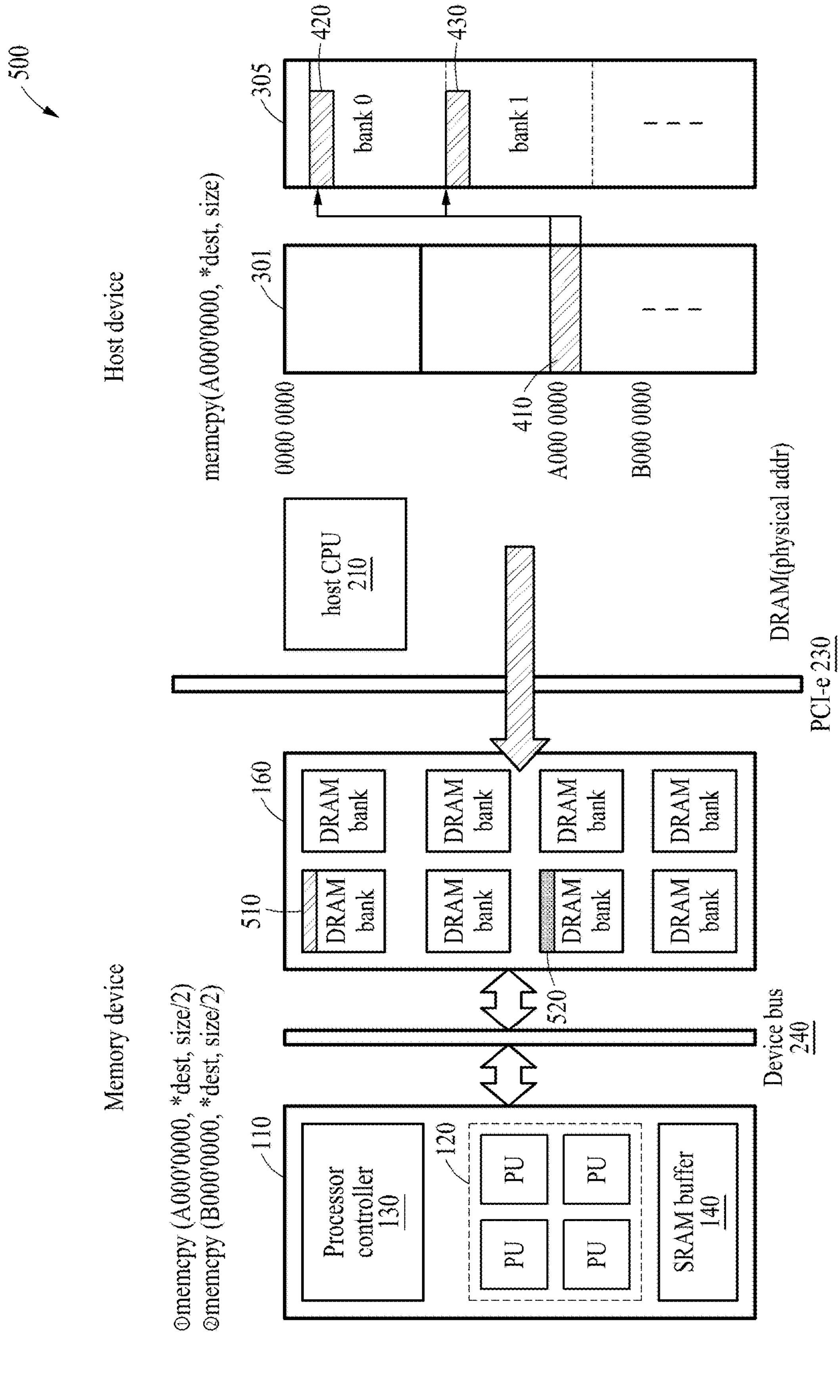
FIGS. 5A and 5B are diagrams illustrating a third scheme of reading second data divided through interleaving among read schemes of a memory device, according to an embodiment.
Figure 5B:
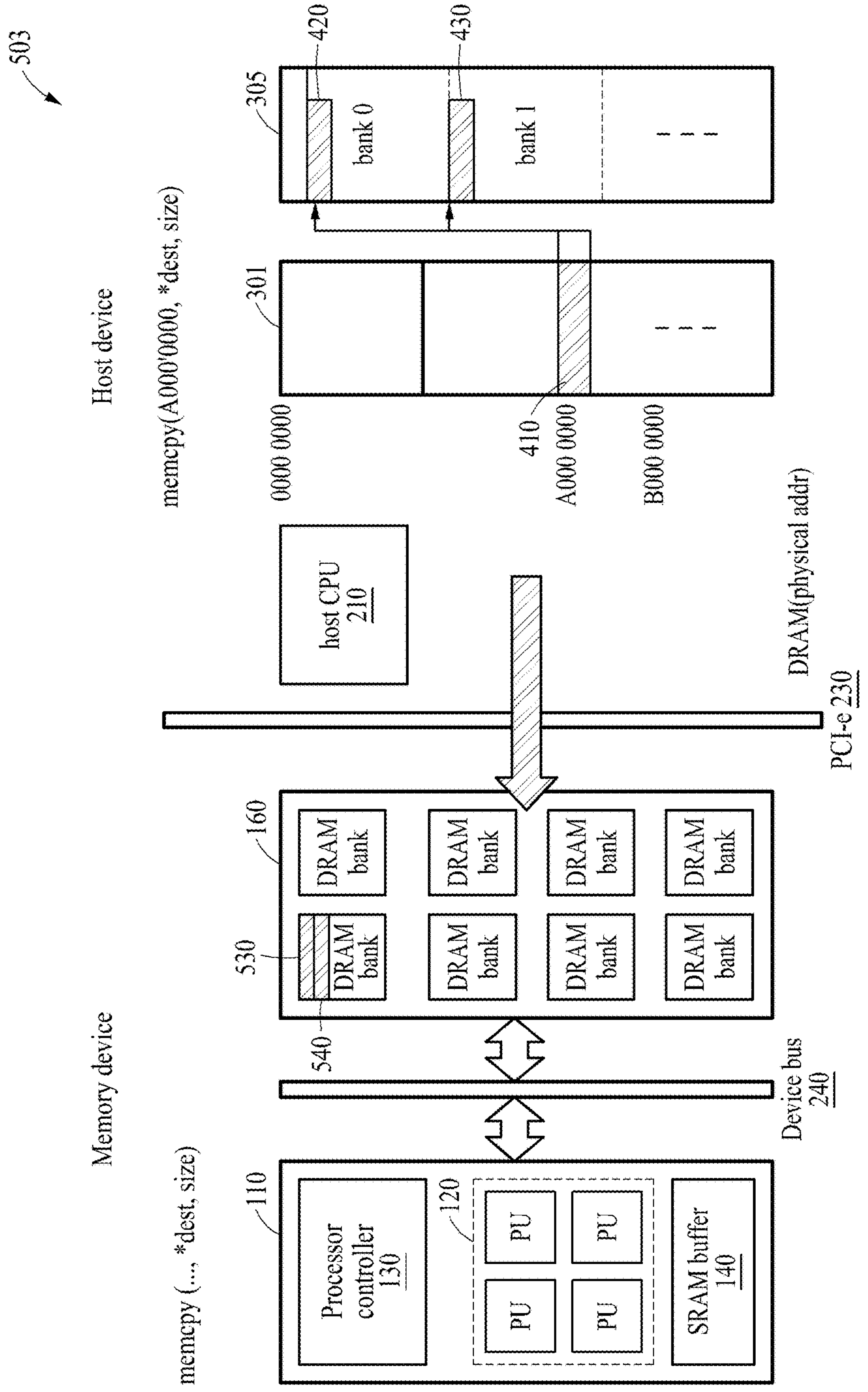

FIGS. 5A and 5B are diagrams illustrating a third scheme of reading second data divided through interleaving among read schemes of a memory device, according to an embodiment.

FIG. 5A illustrates a diagram 500 showing the process in which the memory device executes the memcpy instruction by dividing the second data using a memory interleaving scheme.

The memcpy instruction is an instruction for copying a value. For example, the memcpy instruction may copy n bytes of data from a source memory area to a destination memory area. When the memcpy instruction is executed, the same data may be stored in the source memory area and the destination memory area. The memcpy instruction may return a pointer to the destination memory area.

When copying is to be performed such that the source memory area and the destination memory area overlap, that is, when data stored in the source memory area is to be moved to the destination memory area, the memmove instruction may be used.

For example, "memcpy(A000'0000, *dest, size/2)" may correspond to an instruction that copies data from an address 410 ("A000'0000"), which is a source memory area, to the destination memory area (*dest), with a size of size/2.

When storing the second data in divided areas is useful to an operation, the memory device may use an interleaving scheme to divide the second data stored in the bank 0 420 and the bank 1 430 of the second memory banks 305 into segments and store these segments of the second data in different areas (e.g., a first area 510 and a second area 520), as illustrated in FIG. 5A. In this case, the memory device may divide the second data in half and store the divided data in the different areas (e.g., 510 and 520) of the first memory banks 160. In this case, the different areas (e.g., 510 and 520) may correspond to addresses of different memory banks.

For example, an instruction, such as memcpy(A000'0000, *dest, size) may be transmitted from a host device. When dividing the second data into segments and storing these segments of the second data are useful to an operation, the memory device may change the corresponding instruction to ①memcpy(A000'0000, *dest, size/2) and ②memcpy(B000'0000, *dest, size/2) to divide the second data and store the divided second data in the first memory banks.

Accordingly, the memory device may divide the second data stored in the bank 0 420 and the bank 1 430 of the second memory banks 305 into segments and copy these segments to the different areas (e.g., 510 and 520) of the first memory banks 160. In other words, the memory device may store, the second data stored in the bank 0 420 in the first area 510, and store, the second data stored in the bank 1 430 in the second area 520.

In this manner, to copy the second data stored in the bank 0 420 and the bank 1 430 of the second memory banks 305 of the host device to the memory device to use this second data, it may be necessary to invoke or execute the memcpy instruction multiple times.

According to an embodiment, the memory device executes the memcpy instruction by combining portions of the second data stored in the second memory banks 305 into one combined portion, as shown in a diagram 503 illustrated in FIG. 5B.

The memory device may use the desired second data from the bank 0 420 and the bank 1 430 of the second memory banks 305 by invoking memcpy a single time through the data reformatter 135, simultaneously copying the second data to both a third area 530 and a fourth area 540 of the first memory banks 160. The third area 530 and the fourth area 540 may be adjacent or contiguous addresses in the same first memory bank.

Figure 6:
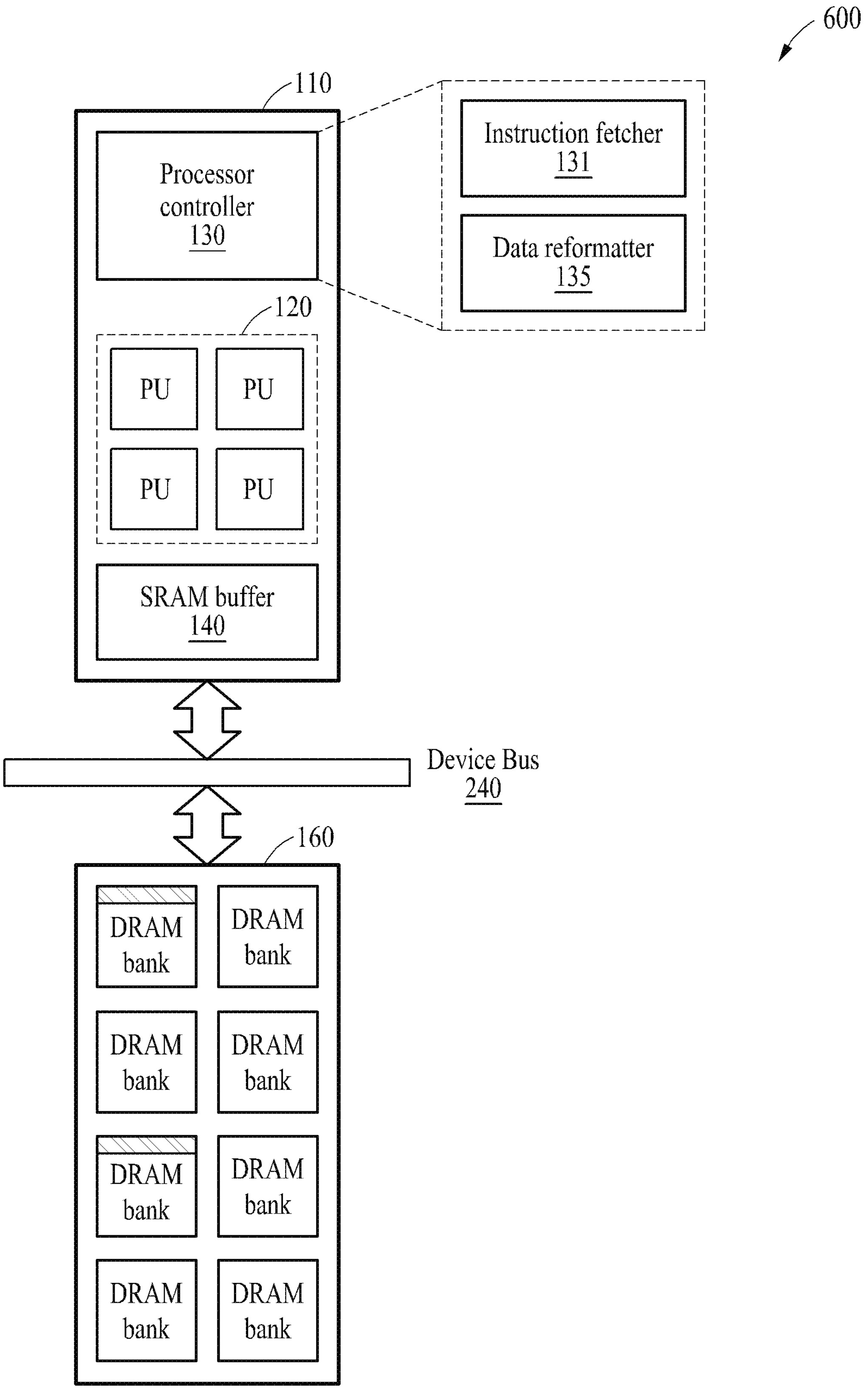
FIG. 6 is a diagram illustrating an operation of a processor controller, according to an embodiment.

FIG. 6 is a diagram illustrating an operation of a processor controller, according to an embodiment. FIG. 6 illustrates a diagram 600 showing a structure and an operation of the memory processor 110 including the processor controller 130.

The processor controller 130 may perform data processing on memory areas of the first memory banks 160 according to an instruction received from a host device. For example, the instruction may include tasks such as writing, reading, moving, and deleting data in a memory area, executing acceleration logic, and granting and/or restricting access to the memory area. The processor controller 130 may receive and read information about data stored in a host processor. The processor controller 130 may write data to the SRAM buffer 140 and output information about the written data to the host processor. The processor controller 130 may store data (e.g., first data and/or second data) in a near-memory area. The near-memory area may refer to a storage space accessible by the PUs 120, not through the data bus between the host processor and the memory area. The processor controller 130 may include, for example, a microprocessor, a CPU, a processor core, a multi-core processor, a multiprocessor, an ASIC, or an FPGA.

The processor controller 130 may control the plurality of PUs 120 to perform an operation. The processor controller 130 may include, for example, the instruction fetcher 131 and the data reformatter 135.

The instruction fetcher 131 may fetch, from the host device, an instruction including information for an operation performed by the memory processor 110. The data reformatter 135 may relocate the first data in the first memory banks 160 to match a read scheme corresponding to an operation type included in the instruction fetched by the instruction fetcher 131. For example, the first data may correspond to a weight for a MAC operation. However, embodiments are not limited thereto. In this case, the read scheme corresponding to the operation type may correspond to a read scheme that is useful in performing the operation included in the instruction. For example, when a first scheme of reading data row-by-row is useful in performing the operation included in the instruction, the data reformatter 135 may relocate the first data to the first memory banks 160 row-wise, thereby providing more useful data reading.

The data reformatter 135 may read the data using a useful scheme based on the read scheme corresponding to the operation type included in the instruction, thereby increasing operation performance.

Figure 7:
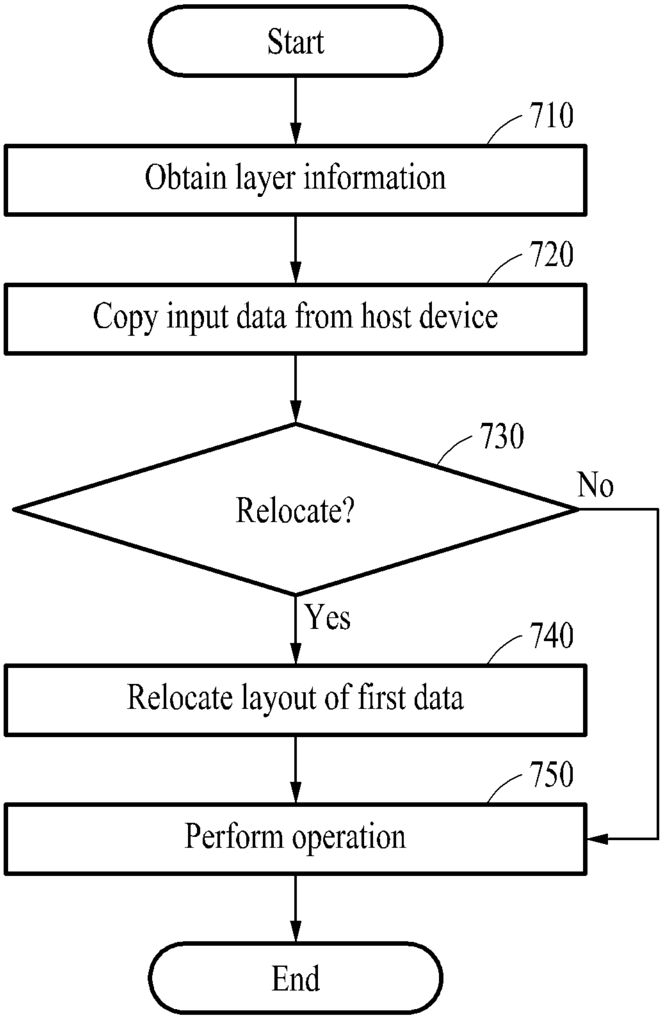
FIG. 7 is a flowchart illustrating an operation of a memory processor, according to an embodiment.

FIG. 7 is a flowchart illustrating an operation of a memory processor, according to an embodiment. Operations to be described with reference to FIG. 7 and below may be performed sequentially but not necessarily. For example, the order of the operations may change and at least two of the operations may be performed in parallel, or one operation may be performed separately.

Referring to FIG. 7, a memory processor performs an operation through operations 710 to 750.

In operation 710, the memory processor obtains layer information. Here, the layer information may include information related to the number of rows and columns in memory banks of a host device and/or a memory device, the sizes of the memory banks, an offset, a data storage direction or an operation type for data. The layer information may correspond to information for the operation described above.

In operation 720, the memory processor copies input data from the host device, based on the layer information obtained in operation 710. The memory processor may determine, based on the operation type included in the layer information, a read scheme by which a memory controller reads second data stored in second memory banks of the host device, read the input data according to the determined read scheme, and copy the input data to first memory banks of the memory device.

In operation 730, the memory processor determines whether to relocate first data in the first memory banks to match the read scheme. When determining to relocate the first data to the first memory banks, the memory processor may relocate the layout of the first data to the first memory banks in operation 740.

In operation 750, the memory processor performs an operation (e.g., an operation included in the layer information) on the first data relocated in operation 740.

When determining not to relocate the first data to the first memory banks in operation 730, the memory processor may perform an operation on the data copied to the first memory banks of the memory device in operation 750.

Figure 8A:
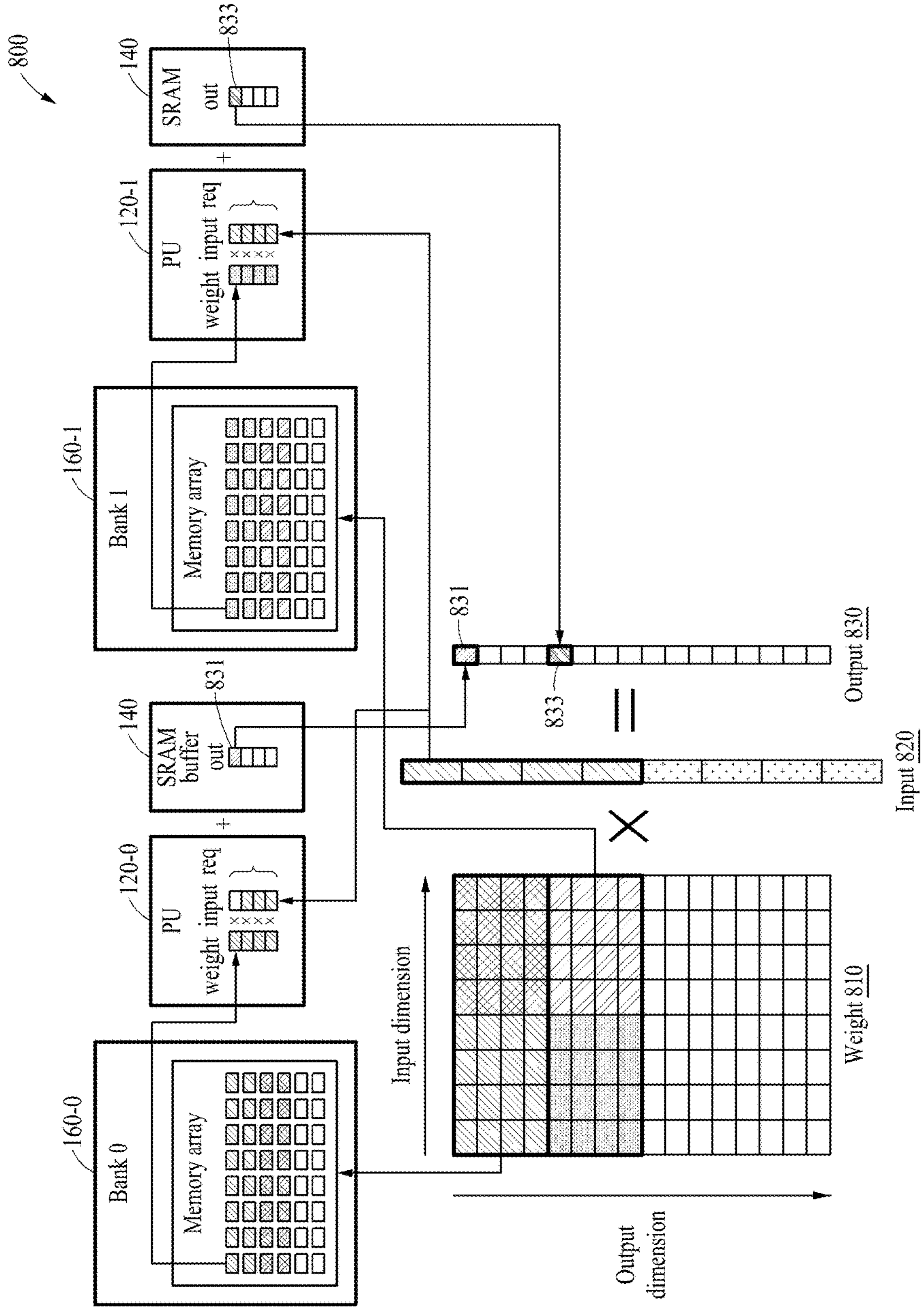
FIGS. 8A, 8B, and 9 are diagrams illustrating an operating method of a data reformatter, according to an embodiment.
Figure 8B:
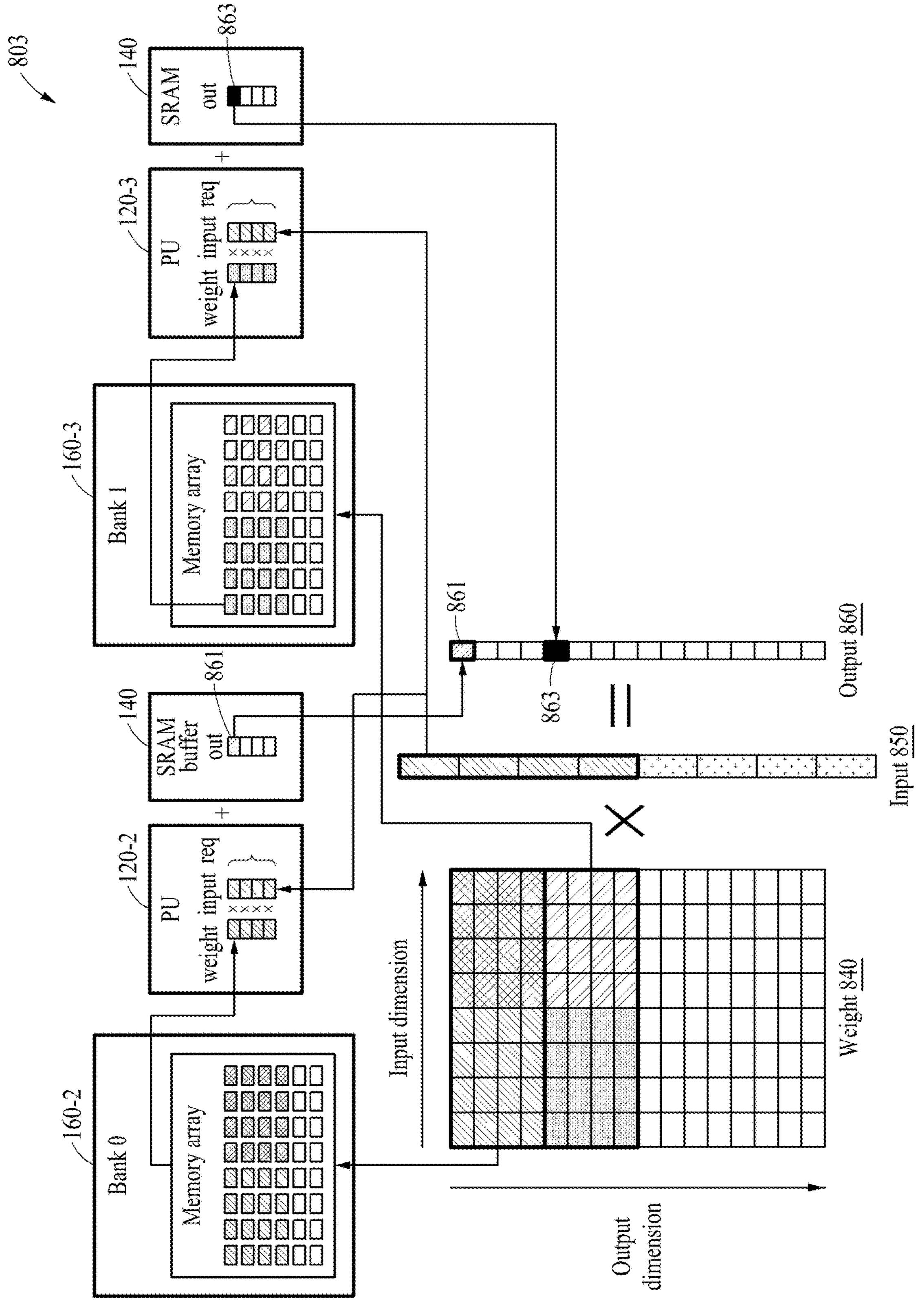

FIGS. 8A and 8B are diagrams illustrating an operating method of a data reformatter, according to an embodiment. FIG. 8A illustrates a diagram showing an operation of a data reformatter when a GEMV operation is performed by the plurality of PUs 120.

The GEMV operation may correspond to an operation of generating a new vector by multiplying a given matrix by a vector. For example, when the operation Vector Y=GEMV (Matrix M, Vector X) is performed, a GEMV kernel and a reduce kernel for row-wise accumulation may be used. The memory processor may store input vector X in a register of the plurality of PUs 120, read input matrix M from first memory banks, and perform the GEMV operation on the input vector X and the input matrix M. In this case, a value (e.g., weights 810 or input matrix M) for the memory processor may be stored in the first memory banks. The memory processor may consistently accumulate operation results in a buffer or a register of the memory processor.

For example, it may be assumed that a plurality of PUs 120-0 and 120-1 has a throughput capacity of 4×4 at a time and that the plurality of PUs 120-0 and 120-1 reads first data (e.g., weights 810) in the row direction.

A memory device may perform, for example, an operation on eight elements of six rows using a GEMV function and accumulate values at a stride of 4 within the same row while repeating this operation multiple times.

When the plurality of PUs 120-0 and 120-1 reads the first data (e.g., weights 810 or input matrix M) in the row direction, arranging the weights 810 in an 8×2 layout in the row direction in memory arrays, which respectively correspond to first memory banks 160-0 and 160-1, may be effective in performing an operation. In this case, the data reformatter 135 may relocate the first data in the memory arrays of the first memory banks according to the throughput that the plurality of PUs 120-0 and 120-1 may process at a time.

The memory device may perform an operation on input data 820 and the weights 810 stored in the first memory bank (bank 0 160-0) by reading the weights 810 row-by-row in the first memory bank (bank 0 160-0) and loading the input data 820 into the input register of the PU 120-0. The memory device may load the four pieces of input data 820 according to the throughput of the PU 120-0. The memory device may perform a multiplication operation on four weights in the row direction among the weights stored in the first memory bank (bank 0 160-0) and the four pieces of input data 820. In this case, the memory device may reuse the input data 820 by as many times as the number of required calculations before replacing the input data 820. The memory device may output an operation (e.g., multiplication operation) result 830 from multiplying the input data 820 and the weights 810 read row-wise from the first memory bank (bank 0 160-0).

The memory device may perform an operation on the input data 820 and the weights 810 stored in the first memory bank (bank 1 160-1) by reading the weights 810 row-by-row in the first memory bank (bank 1 160-1) and loading the input data 820 into the input register of the PU 120-1. The memory device may load the four pieces of input data 820 according to the throughput of the PU 120-1. The memory device may perform a multiplication operation on four weights in the row direction among the weights stored in the first memory bank (bank 1 160-1) and the four pieces of input data 820. In this case, the memory device may reuse the input data 820 by as many times as the number of required calculations before replacing the input data 820. The memory device may output a result 830 of an operation (e.g., multiplication operation) from multiplying the input data 820 and the weights 810 read row-wise in the first memory bank (bank 1 160-1).

The operation result of the PU 120-0 may be stored in a first area 831 of the SRAM buffer 140. The operation result of the PU 120-1 may be stored in a second area 833 of the SRAM buffer 140.

FIG. 8B illustrates a diagram 803 showing a process in which the data reformatter performs a GEMV operation using weight values relocated in a memory array when the GEMV operation is performed by the plurality of PUs 120.

For example, it may be assumed that the throughput, that a plurality of PUs 120-2 and 120-3 may process at a time, is 4×4 and that the plurality of PUs 120-2 and 120-3 reads the first data (e.g., weights 840) in the row direction.

A memory device may perform, for example, an operation on eight elements of six rows using a GEMV function and accumulate values at a stride of 4 within the same row while repeating this operation multiple times.

When the plurality of PUs 120-2 and 120-3 reads the first data (e.g., weights 810 or input matrix M) in the column direction, arranging the weights 840 in a layout of 4×4 in the row direction in memory arrays respectively corresponding to first memory banks 160-2 and 160-3 may be effective. In this case, the data reformatter 135 may relocate the first data in the memory arrays of the first memory banks according to calculations that the plurality of PUs 120-2 and 120-3 may process at a time.

The memory device may perform an operation between input data 850 and the weights 840 stored in the first memory bank (bank 0 160-2) by reading the weights 840 column-wise in the first memory bank (bank 0 160-2) and loading the input data 850 into the input register of the PU 120-2. The memory device may load the four pieces of input data 850 according to the throughput of the PU 120-2. The memory device may perform a multiplication operation on the four pieces of input data 850 and four weights 840 in the row direction among the weights stored in the first memory bank (bank 0 160-2). In this case, the memory device may reuse the input data 850 by as many times as the number of required calculations before replacing the input data 850.

The memory device may output a result 860 of an operation (e.g., multiplication operation) on the input data 850 and the weights 840 read column-wise from the first memory bank (bank 0 160-2).

In addition, the memory device may perform an operation on the input data 850 and the weights 840 stored in the first memory bank (bank 1 160-3) by reading the weights 840 column-by-column in the first memory bank (bank 1 160-3) and loading the input data 850 into the input register of the PU 120-2. The memory device may load the four pieces of input data 850 according to the throughput of the PU 120-2. The memory device may perform a multiplication operation on four weights in the row direction among the weights stored in the first memory bank (bank 1 160-3) and the four pieces of input data 840. In this case, the memory device may reuse the input data 850 by as many times as the number of required calculations before replacing the input data 850. The memory device may output a result 860 of an operation (e.g., multiplication operation) from multiplying the input data 850 and the weights 840 read column-by column in the first memory bank (bank 1 160-3).

The operation result of the PU 120-2 may be stored in a first area 861 of the SRAM buffer 140. The operation result of the PU 120-3 may be stored in a second area 863 of the SRAM buffer 140.

Figure 9:
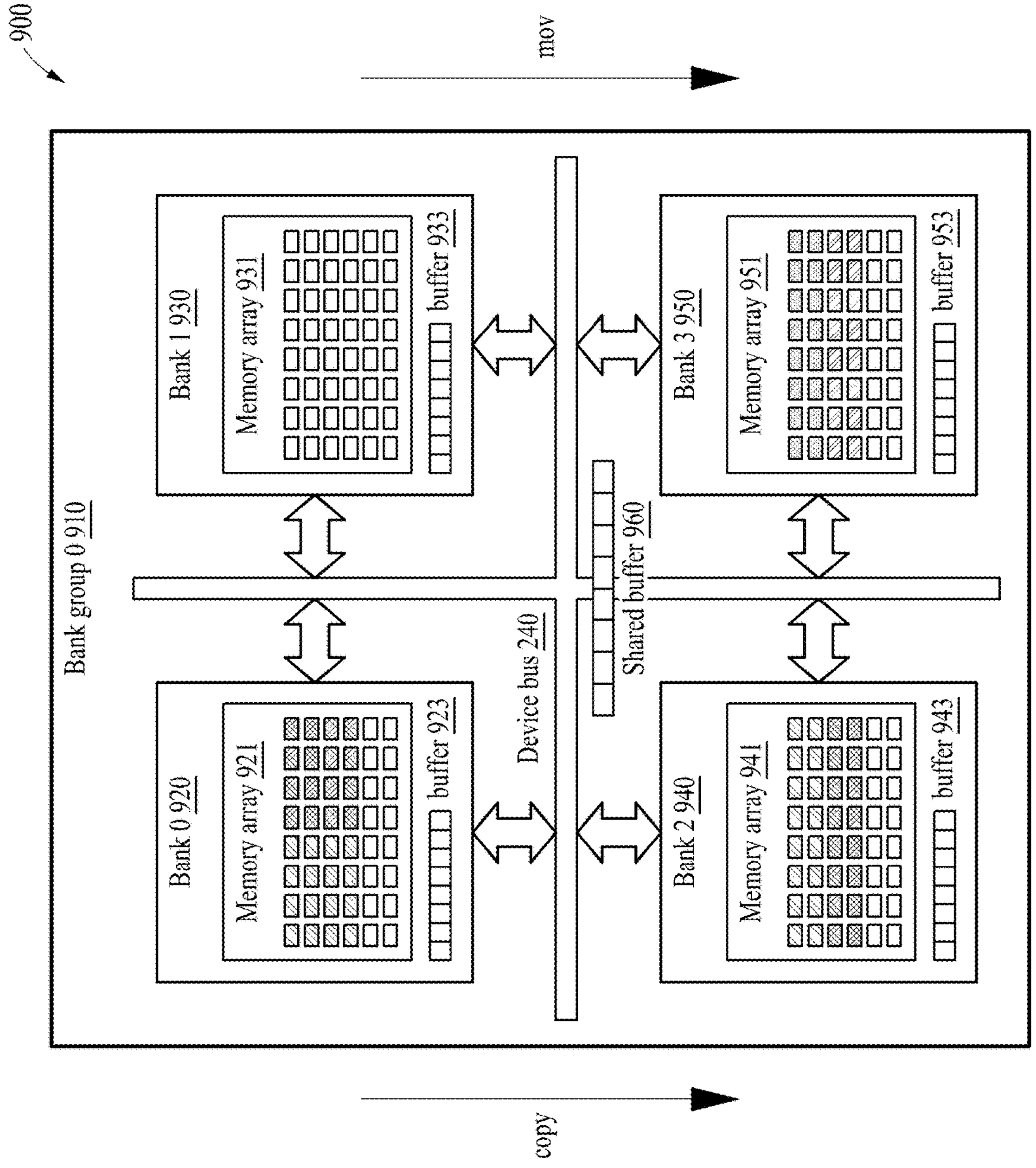

FIG. 9 is a diagram illustrating an operating method of a data reformatter, according to an embodiment. FIG. 9 illustrates a diagram 900 showing a process in which the data reformatter 135 moves or copies first data stored in memory arrays 921, 931, 941, and 951 of memory banks (e.g., memory bank 0 920, memory bank 1 930, memory bank 2 940, and memory bank 3 950) of bank group 0 such that the first data is moved or copied to match a desired row and/or column of another memory bank.

The memory banks 920, 930, 940, and 950 may further include row buffers 923, 933, 943, and 953 respectively corresponding to the memory banks 920, 930, 940, and 950. The data reformatter 135 may copy data in the form of (4×4)+ (4×4) stored in a first area of the memory array 921 of the memory bank 0 920 to the row buffer 923 and move the first data copied to the row buffer 923 to a second area corresponding to a column or a row of another bank of the memory array 941 of the memory bank 2 940 in the form of (2×8)+ (2×8) to match a read scheme.

The data reformatter 135 may move and/or copy data stored in one of the memory arrays 921, 931, 941, and 951 of the memory banks 920, 930, 940, and 950 to the row buffers 923, 933, 943, and 953 and then move and/or copy the data to match a desired row and/or column of another memory bank.

In addition, the memory banks may further include a shared buffer 960 shared among the memory banks 920, 930, 940, and 950. The data reformatter 135 may move or copy first data stored in a first area of at least one memory bank (e.g., memory bank 1 930) among the memory banks 920, 930, 940, and 950 to the shared buffer 960 and then move or copy the moved or copied first data to a second area of another memory bank (e.g., the memory array 951 of the memory bank 3 950) to match a desired row and/or a column.

In this case, the data reformatter 135 may move the first data copied to the shared buffer 960 to the memory array 951 of the memory bank 3 950 in the form of (2×8)+ (2×8) to match a read scheme.

FIG. 10 is a diagram illustrating a register set of a processor controller, according to an embodiment. FIG. 10 illustrates a diagram 1000 showing a DRAM map 1010 for a host device and an instruction register 1030 of a processor controller (e.g., NMP controller) for a memory device.

A processor (e.g., CPU) of the host device may configure the DRAM map 1010 and the instruction register 1030 of the processor controller, as illustrated in FIG. 10.

The DRAM map 1010 may include, for example, at least one of the number of rows of second memory banks, the number of columns of the second memory banks, the number of second memory banks, the sizes of the second memory banks, and an offset. For example, the DRAM map 1010 may identify the row number of a row in a memory bank or a column number of a column in the memory bank; a bank number of the bank; a size of the bank; an offset to the row or column within the bank. The instruction register 1030 may include processor register set information that may include, for example, at least one of information related to the sizes of first memory banks, the number of rows of the first memory banks, the number of columns of the first memory banks, the number of first memory banks, whether to relocate the first data, the direction in which the first data is stored in the first memory banks, and an operation type for the first data.

The host device may configure the bits of the operation type field (op type[3:0]) indicating information related to an operation type in the instruction register 1030. In addition, the host device may configure the bits of the reformat[2:0] field indicating whether data is relocated.

The operation type (op type) field may include information related to an operation type, such as the direction (copy way) in which an instruction for moving and/or copying data for an operation is executed, types of operations performed by the plurality of PUs 120, and/or information related to relocation of data for the first memory banks of the memory device.

The direction (copy way) in which the instruction for moving and/or copying data for an operation is executed may include, for example, a first direction from a second memory bank (DRAM) of the host device to the first memory banks 160 of the memory device 110 and a second direction from the SRAM buffer 140 of the memory processor 110 to the second memory bank (DRAM) of the host device.

The host device may set the direction (copy way) in which the instruction for copying (memory copy) and moving data is executed in steps (1), (2) and (3_. (1) The direction may be set by setting a memcpy way bit.

Copying data from the host device to the memory processor 110 may be performed by setting a copy direction according to the bit setting of the execution direction (copy way) of an NMP control register.

host dram to nmp dram: row-wise/column-wise/interleave way:

As illustrated in FIGS. 4A, 4B, 5A, and 5B, the host device may perform row-wise and column-wise moving and copying and moving and copying through interleaving, from DRAM of the host device to the memory processor 110.

nmp SRAM buffer to host dram:

The memory processor 110 may store a calculation result in SRAM and then perform moving and/or copying to the DRAM of the host device.

nmp dram to nmp dram (reformat case):

The memory processor 110 may move and/or copy data from the DRAM of the memory processor 110 to a DRAM bank of another memory processor to reformat the data.

(2) When copying from the host device is required, the host device may set the number of banks, the number of columns, the number of rows, an offset, and the size of a DRAM map (Bank/Col/Row num, offset, size).

When copying from the DRAM of the host device is required, the host device may set, in the register of the NMP controller, the location and size of the data to fetch from the DRAM.

The host device may set the number of banks (bank number), the number of rows (row number), the number of columns (column number), the size, and an offset of the host device and may also set banks, rows and columns in the DRAM of the memory processor 110 to which data is copied.

(3) Reformat: buffer select, nmp dram copy area and size

Reformatting may be performed as the memory processor 110 moves or copies data to a desired area using a row buffer or a shared buffer of a DRAM bank. In this case, the host device may select the type of a buffer to be used and set the area and size for moving and/or copying, as in the case (2).

In addition, the host device may set an operation type (op type) based on the type of an AI operator involved in operations performed by the plurality of PUs 120 and may set a memory area (e.g., bank, row, column, size, etc.) of a memory bank to be processed and/or a register of the plurality of PUs 120.

The types of operations performed by the plurality of PUs 120 may include various AI operations, such as a GEMV operation, a MAC operation, and an Eltwise operation. However, embodiments are not limited thereto.

The relocation-related information may include the setting of a reformat bit indicating whether relocation is performed and/or information about whether to perform relocation using a relocation scheme (e.g., a row buffer) or a shared buffer.

Figure 11:
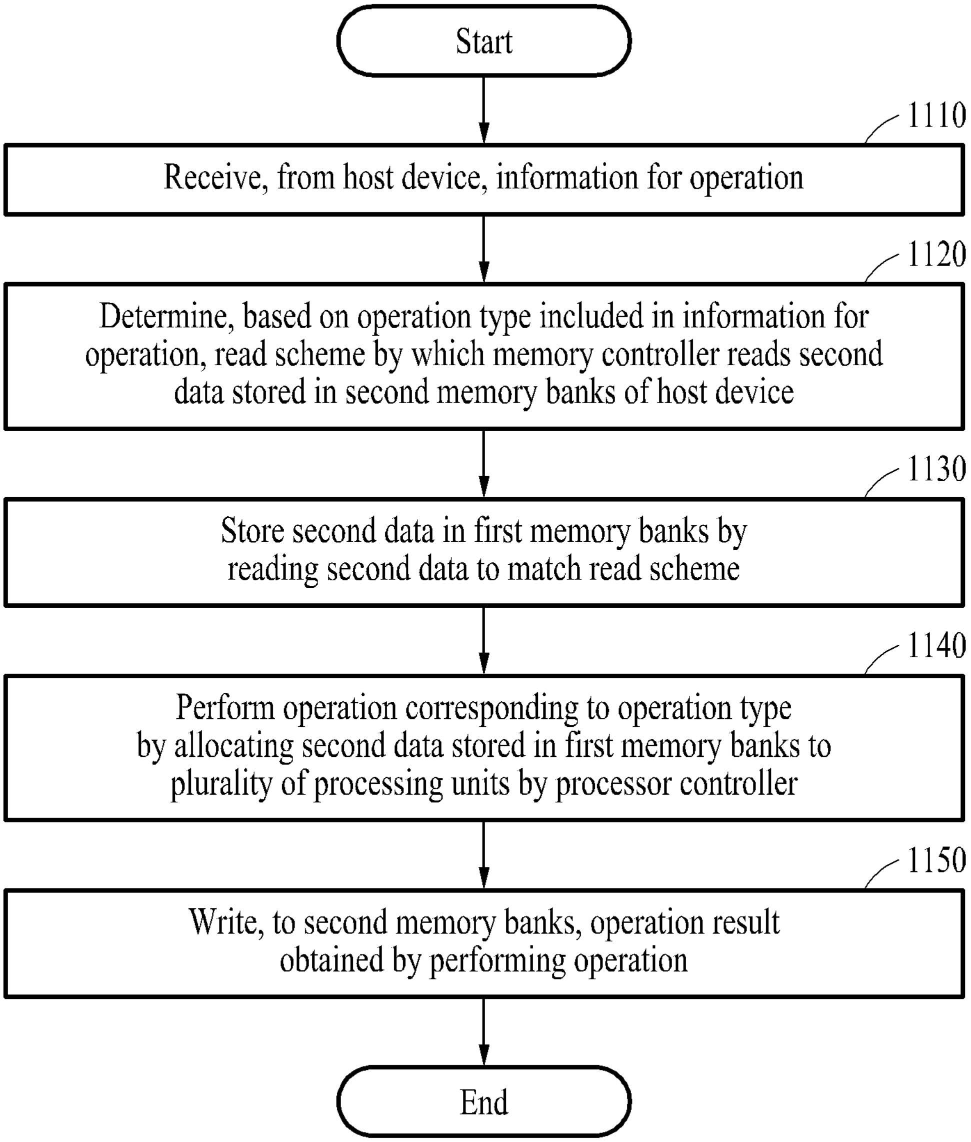
FIG. 11 is a flowchart illustrating an operating method of a memory device, according to an embodiment.

FIG. 11 is a flowchart illustrating an operating method of a memory device, according to an embodiment. Referring to FIG. 11, the memory device performs an operation through operations 1110 to 1150 to generate an operation result and transmits the operation result to a host device.

In operation 1110, the memory device receives, from the host device, information for an operation to be performed by a memory processor of the memory device.

In operation 1120, the memory device determines, based on an operation type included in the information for an operation received in operation 1110, a read scheme by which a memory controller reads second data stored in second memory banks of the host device. The memory device may determine an address area for reading the second data from the second memory banks by considering the read scheme.

In operation 1130, the memory device stores the second data read from the second memory banks of the host device in first memory banks by reading the second data to match the read scheme determined in operation 1120. The memory device may relocate first data for the memory processor in the first memory banks for the memory processor to match the read scheme.

In operation 1140, the memory device performs an operation corresponding to the operation type by allocating the second data stored in the first memory banks in operation 1130 to a plurality of PUs by a processor controller.

In operation 1150, the memory device writes, to the second memory banks, an operation result obtained by performing the operation in operation 1140.

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules to perform the operations of the above-described embodiments, or vice versa.

As described above, although the embodiments have been described with reference to certain drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents. Therefore, other implementations, other embodiments, and equivalents to the claims are also within the scope of the following claims.

What is claimed is:

1. A memory device comprising:

a memory processor comprising a plurality of processing units (PUs) and a processor controller configured to control the plurality of PUs; and a memory controller configured to communicate with the processor controller and control first memory banks, wherein the memory processor is configured to:

receive, from a host device, information for an operation, the information including a type of the operation to be performed by the memory processor;

determine, based on the type of the operation, a read scheme from among a plurality of read schemes; and cause the memory controller to read second data from second memory banks of the host device according to the determined read scheme into the first memory banks as first data for the memory processor.

2. The memory device of claim 1, wherein the read scheme is one of:

a first scheme of reading the second data stored in the second memory banks column-wise;

a second scheme of reading the second data stored in the second memory banks row-wise; and a third scheme of accessing and reading the second data stored in the second memory banks with different addresses simultaneously through interleaving.

3. The memory device of claim 1, wherein the memory processor is configured to relocate the first data in the first memory banks to match the read scheme.

4. The memory device of claim 1, wherein the memory processor is configured to:

receive the information for the operation from the host device; and store the information for the operation in a register of the processor controller.

5. The memory device of claim 4, wherein the information for the operation comprises:

a dynamic random-access memory (DRAM) map comprising at least one of a number of rows of the second memory banks, a number of columns of the second memory banks, a number of the second memory banks, sizes of the second memory banks, and an offset; and processor register set information comprising at least one of information related to sizes of the first memory banks, a number of rows of the first memory banks, a number of columns of the first memory banks, a number of first memory banks, information indicating whether to relocate the first data, a direction in which the first data is stored in the first memory banks, and an operation type for the first data.

6. The memory device of claim 1, wherein the memory processor is configured to determine, based on at least one of the type of the operation and throughputs of the plurality of PUs, whether to relocate the first data to the first memory banks and whether to reuse the second data read from the second memory banks.

7. The memory device of claim 1, wherein the memory processor is configured to relocate the first data in the first memory banks or divide the first data according to throughputs of the plurality of PUs.

8. The memory device of claim 1, wherein the memory processor is configured to determine an address area for reading the second data in the second memory banks by considering the read scheme.

9. The memory device of claim 1, wherein the memory processor is configured to:

store, in the first memory banks, the second data read from the second memory banks of the host device; and enable the plurality of PUs to perform an operation corresponding to the type of the operation by allocating the second data stored in the first memory banks to the plurality of PUs by the processor controller.

10. The memory device of claim 9, wherein the memory processor further comprises a static random-access memory (SRAM) buffer, and the memory processor is configured to:

store, in the SRAM buffer, an operation result obtained when the plurality of PUs performs the operation corresponding to the type of the operation; and write the operation result stored in the SRAM buffer to the second memory banks.

11. The memory device of claim 1, wherein the processor controller comprises:

an instruction fetcher configured to fetch, from the host device, an instruction comprising information for an operation performed by the memory processor; and a data reformatter configured to relocate the first data to the first memory banks to match the read scheme corresponding to the type of the operation comprised in the instruction.

12. The memory device of claim 11, further comprising:

row buffers respectively corresponding to the first memory banks, wherein the data reformatter is configured to copy the first data stored in a first area of the first memory banks to the row buffers and move the first data copied to the row buffers to a second area corresponding to a column or a row of another bank of the first memory banks to match the read scheme.

13. The memory device of claim 11, further comprising:

a shared buffer shared among the first memory banks, wherein the data reformatter is configured to copy the first data stored in a first area of the first memory banks to the shared buffer and move the first data copied to the shared buffer to a second area corresponding to a column or a row of another bank of the first memory banks to match the read scheme.

14. The memory device of claim 1, wherein the memory processor is configured to receive a request for access to the first memory banks from the host device through an interface based on a compute express link (CXL) protocol or a peripheral component interconnect express (PCI-e) protocol.

15. The memory device of claim 1, wherein the memory processor is connected to the first memory banks through a device bus, and the memory controller is connected to the host device through a peripheral component interconnect express (PCI-e) interface.

16. The memory device of claim 1, wherein the memory device is integrated into a mobile device, a mobile computing device, a mobile phone, a smartphone, a personal digital assistant (PDA), a fixed location terminal, a tablet computer, a computer, a wearable device, a laptop computer, a server, an entertainment unit, a navigation device, a communication device, a global positioning system (GPS) device, a television, a tuner, a satellite radio, a music player, a digital video player, a digital video disk (DVD) player, a vehicle, a component of the vehicle, an avionics system, a drone, a multicopter, or a medical device.

17. An operating method of a memory device, the operating method comprising:

receiving, from a host device, information for an operation, the information including a type of the operation to be performed by a memory processor of the memory device;

determining, based on the type of the operation, a read scheme from among a plurality of read schemes;

causing a memory controller of the memory device to read second data from second memory banks of the host device according to the determined read scheme into first memory banks as first data for the memory processor;

performing an operation corresponding to the type of the operation by allocating the first data stored in the first memory banks to a plurality of processing units (PUs) by a processor controller; and writing an operation result obtained by performing the operation on the first memory banks.

18. The operating method of claim 17, wherein the determining of the read scheme comprises determining an address area for reading the second data from the second memory banks by considering the read scheme.

19. The operating method of claim 17, wherein the reading of the second data in the memory banks comprises relocating the first data for the memory processor to the first memory banks for the memory processor to match the read scheme.

20. A non-transitory computer-readable storage medium storing instructions that, when executed by a processor, causes the processor to perform the operating method of claim 17.

* * * * *